United States Patent [19]
Takashima et al.

[11] Patent Number: 4,811,546
[45] Date of Patent: Mar. 14, 1989

[54] FILM CASSETTE OPENER FOR UNLOADING A FILM FROM A FILM CASSETTE AND FOR LOADING A FILM IN THE FILM CASSETTE

[75] Inventors: Yutaka Takashima; Mikio Tsuyuki; Izumi Seto, all of Kanagawa, Japan

[73] Assignee: Fuji Photo Film Co., Ltd., Kanagawa, Japan

[21] Appl. No.: 166,598

[22] Filed: Mar. 10, 1988

[30] Foreign Application Priority Data

| Mar. 11, 1987 | [JP] | Japan | 62-55502 |
| Mar. 11, 1987 | [JP] | Japan | 62-55505 |
| Mar. 23, 1987 | [JP] | Japan | 62-68529 |
| May 8, 1987 | [JP] | Japan | 62-112102 |

[51] Int. Cl.⁴ .......... B65B 5/10; B65B 43/38; B65G 65/04
[52] U.S. Cl. .......... 53/266 R; 53/382; 198/627; 198/628; 271/30.1; 271/107; 414/411
[58] Field of Search .......... 53/266 R, 244, 249, 53/381 R, 382, 167; 414/403, 404, 411, 416; 271/97, 98, 99, 106, 283; 198/627, 628

[56] References Cited

U.S. PATENT DOCUMENTS

| 3,662,516 | 5/1972 | Wiseman | 53/382 X |
| 3,828,195 | 8/1974 | Snarr | 414/411 |
| 3,891,854 | 6/1975 | Hura | 414/411 X |
| 4,049,142 | 9/1977 | Azzaroni | 414/411 X |
| 4,354,336 | 10/1982 | Azzaroai | 53/382 X |
| 4,403,899 | 9/1983 | Lampe et al. | 198/627 X |
| 4,480,423 | 11/1984 | Müller | 53/382 X |
| 4,514,958 | 5/1985 | Hoorn | 53/382 X |
| 4,539,794 | 9/1985 | Azzaroni | 53/266 R X |
| 4,553,369 | 11/1985 | Debes et al. | 53/382 X |
| 4,577,452 | 3/1986 | Hösel et al. | 53/266 R |
| 4,590,738 | 5/1986 | Hosel et al. | 53/266 R |
| 4,667,809 | 5/1987 | Raybuck | 198/628 X |
| 4,690,265 | 9/1987 | Gayfer et al. | 198/627 X |
| 4,735,302 | 4/1988 | Marchetti | 198/628 X |
| 4,767,116 | 8/1988 | Eberle | 198/627 X |

Primary Examiner—Horace M. Culver
Attorney, Agent, or Firm—Sughrue, Mion, Zinn, Macpeak & Seas

[57] ABSTRACT

A film cassette opener for unloading a film from, and/or loading the film in, a film cassette capable of accommodating the film. A pair of elongated members are disposed parallel to each other on the opposite sides of a path which enables the film cassette received by the film cassette opener to be moved to a position at which the film can be loaded and/or unloaded. The pair of elongated members are arranged to guide the film cassette along the path by holding opposite sides of the film cassette between them. Also, the present opener is arranged so as to press and move at least one of the elongated members which hold the film cassette therebetween toward the other. Accordingly, since the film cassette is firmly held, it is possible to positively move the film cassette.

21 Claims, 28 Drawing Sheets

F I G. 20
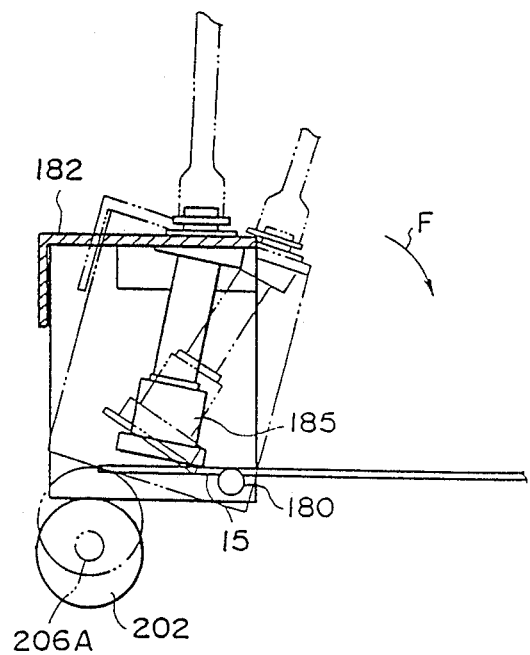

FILM CASSETTE OPENER FOR UNLOADING A FILM FROM A FILM CASSETTE AND FOR LOADING A FILM IN THE FILM CASSETTE

BACKGROUND OF THE INVENTION

1. Field of the Invention

The present invention relates to a film cassette opener for unloading a film from a film cassette and/or loading a film in the film cassette.

2. Description of the Related Art

In each of the cases where such a film cassette opener is used to automatically load an unexposed X-ray film taken out of a magazine containing a plurality of unexposed film sheets therein, in an X-ray film cassette and where such an opener is used to unload an exposed X-ray film from the X-ray film cassette, the cassette is transported along a path of cassette travel within the opener to a predetermined position at which an X-ray film is loaded or unloaded. When the X-ray film cassette reaches this position, a lid of the cassette is opened in a state wherein ambient light is blocked. Accordingly, this type of film cassette opener is commonly arranged in such a manner that, in order to transport the X-ray film cassette to the film unloading (loading) position, a pair of opposite sides of the X-ray film cassette is held and transported along the path of travel to the position at which the X-ray film is loaded or unloaded. The unloaded film sheet is then transported to a film developing machine or an empty film magazine to store the exposed film sheets.

Japanese Patent Laid-open No. 205439/1985 proposes a structure in which a plurality of rollers are employed to hold the opposite ends of the X-ray film cassette.

In this known structure using a plurality of rollers, however, while the X-ray film cassette is being transported along the path of travel, the cassette is often moved in a zigzag manner. In addition, this structure involves disadvantage in that, since the rollers are partially separated from the opposite sides of the cassette, it may be difficult to positively transport the cassette in a desired direction.

Furthermore, when the rollers abuts against the corresponding sides of the cassette by an insufficient level of pressure, slips may occur between the rollers and the corresponding sides of the cassette to cause the roller to rotate idly.

SUMMARY OF THE INVENTION

It is therefore an object of the present invention to provide a film cassette opener capable of positively holding opposite sides of a film cassette while the film cassette is being moved.

In order to achieve the above and other objects and advantages, in accordance with the present invention, there is provided a film cassette opener for opening a film cassette for accommodation of a film, to unload the film from the film cassette and/or to load the film in the film cassette, comprising:

a first elongated member disposed parallel to a path along which the film cassette is allowed to move within the film cassette opener, the first elongated member being brought into contact with one side of the film cassette when the film cassette is placed on the path;

a second elongated member disposed parallel to the path and spaced from the first elongated member in parallel with each other, the second elongated member being brought into contact with the other side of the film cassette opposite to the one side;

holding means for causing at least one of the first elongated member and the second elongated member to move toward and away from the other of the same, thereby causing the first elongated member and the second elongated member to hold the film cassette therebetween;

pressing means for pressing at least one of the first elongated member and the second elongated member which hold the film cassette therebetween in the direction in which the one is made to approach the other of the first and second elongated members; and first driving means for causing movement of the first elongated member and the second elongated member which hold the film cassette therebetween so as to cause the film cassette to move along the path.

In accordance with the present invention, the opposite sides of the film cassette are held by the first elongated member and the second elongated member. During this time, at least one of the side brought into contact with the first elongated member and the side brought into contact with the second elongated member is pressed by a predetermined force applied by the pressing means in the direction in which the film cassette is further tightly held between the first and second elongated members. Accordingly, the opposite sides of the film cassette are positively held between them, and are transported forwardly and backwardly.

BRIEF DESCRIPTION OF THE DRAWINGS

FIG. 20 is a fragmentary section taken along the line XX—XX of FIG. 18;

DESCRIPTION OF THE PREFERRED EMBODIMENTS

The following is a description of preferred embodiments of an X-ray film cassette opener to which the present invention is applied.

Figure 1:
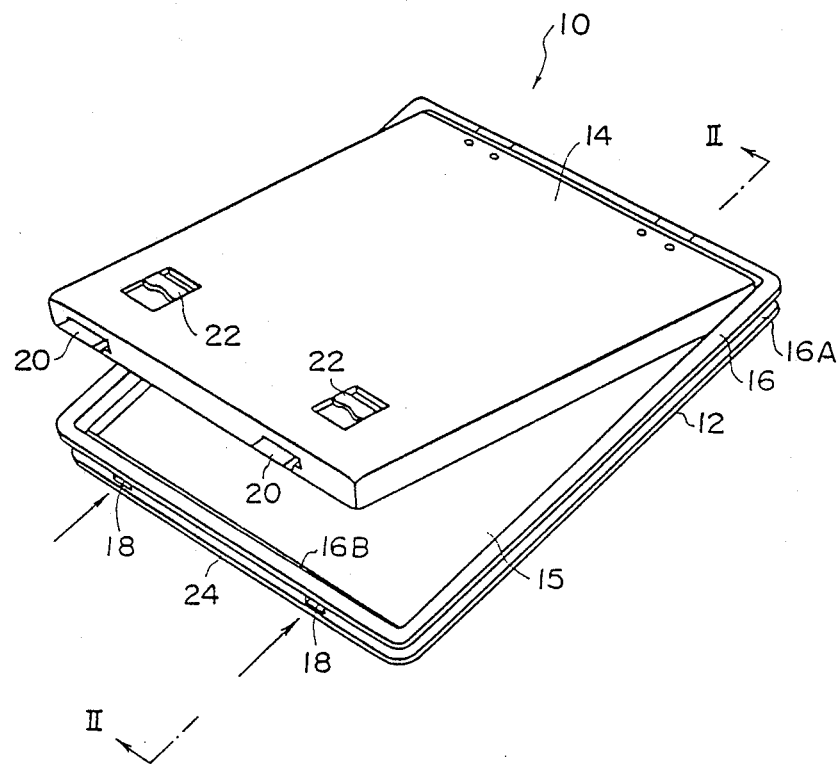
FIG. 1 is a diagrammatic perspective view of a typical example of an X-ray film cassette suitable for use in the present invention.

FIG. 1 illustrates an X-ray film cassette 10 which is used in the embodiments of the present invention which will be described later. This X-ray film cassette 10 is essentially provided with a body 12 and a swingable lid 14 which normally covers the body 12.

The body 12 has a rectangular and planar form, and a frame 16 is formed around the entire periphery of the body 12 in an upright manner such as to surround the interior of the X-ray film cassette 10 which serves as an enclosure for accommodating an X-ray film 15. A recess 16A having an arcuate cross section extends along the overall length of the outer periphery of the frame 16.

Figure 2:
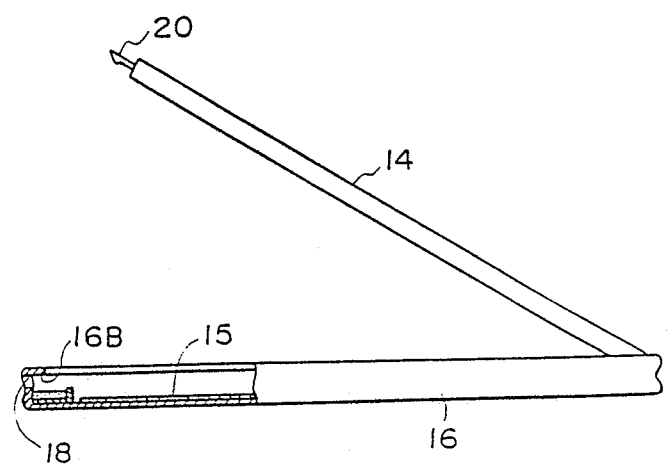
FIG. 2 is a partially sectional view taken along the line II—II of FIG. 1.

An inner step 16B is formed on a portion of the inner periphery of the frame 16 in such a manner as that shown in FIG. 2. On one lateral side of the body 12, a pair of through-holes 18 are formed at an intermediate portion in the frame 16. The pair of through-holes 18 are located at a position below the inner step 16B, offset from the midway position of the frame 16 between the top and the bottom, and adjacent to the top of the side wall 16.

The lid 14, which has a rectangular and planar form, is secured to the frame 16 for pivotal movement about an axis defined on the side of the body 12 opposite to the aforesaid side on which the through-holes 18 are formed. Therefore, the lid 14 can be freely swung to cover or release the opening of the X-ray film cassette 10 which contains the X-ray film 15. At positions which correspond to the pair of through-holes 18 formed in the body 12, a pair of latches 20 project from the free end of the lid 14 toward the corresponding through-holes 18. The latches 20 are slidably secured to the lid 14 so that the length of the projected portion of each of the latches 20 may be changed. Compressive coiled springs (not shown) which urge the latches 20 in the direction in which they would tend to project from the free end of the lid 14.

Therefore, when the lid 14 is closed, the latches 20 engage with the inner step 16B of the frame 16, thereby preventing the lid 14 from opening by accident.

A portion of each of the latches 20 is exposed at the top of the lid 14, and serves as an operating portion 22. If an operator moves the operating portions 22 against the urging forces of the compressive coiled springs (not shown), the latches 20 are disengaged from the inner step 16B to allow the lid 14 to be opened.

In such circumference, when the latches 20 are disengaged from the inner step 16B, the lid 14 is allowed to open to a small extent by the action of a resilient member (not shown) which is disposed in the interior of the X-ray film cassette 10.

Figure 3:
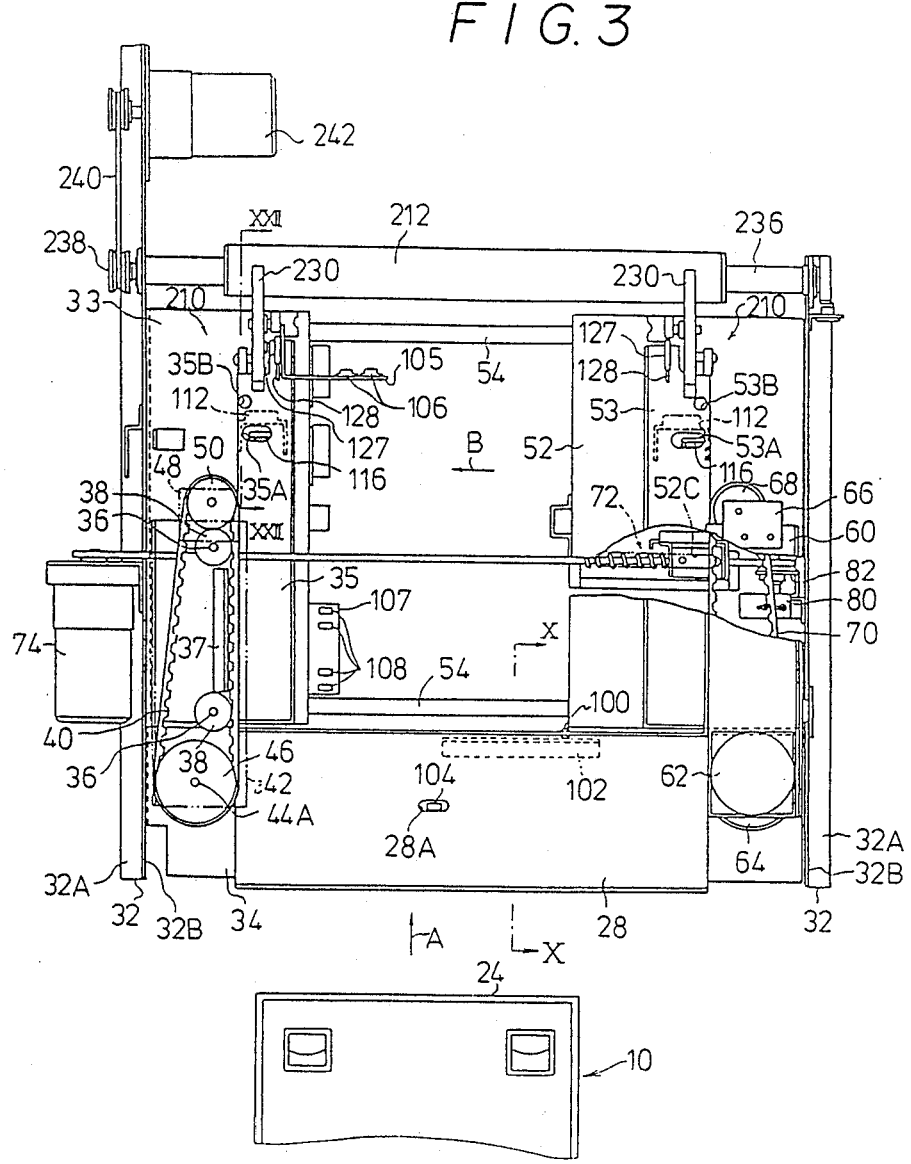
FIG. 3 is a diagrammatic plan view, with portions broken away for the sake of clarity, of a first embodiment of an X-ray film cassette opener in accordance with the present invention.
Figure 4:
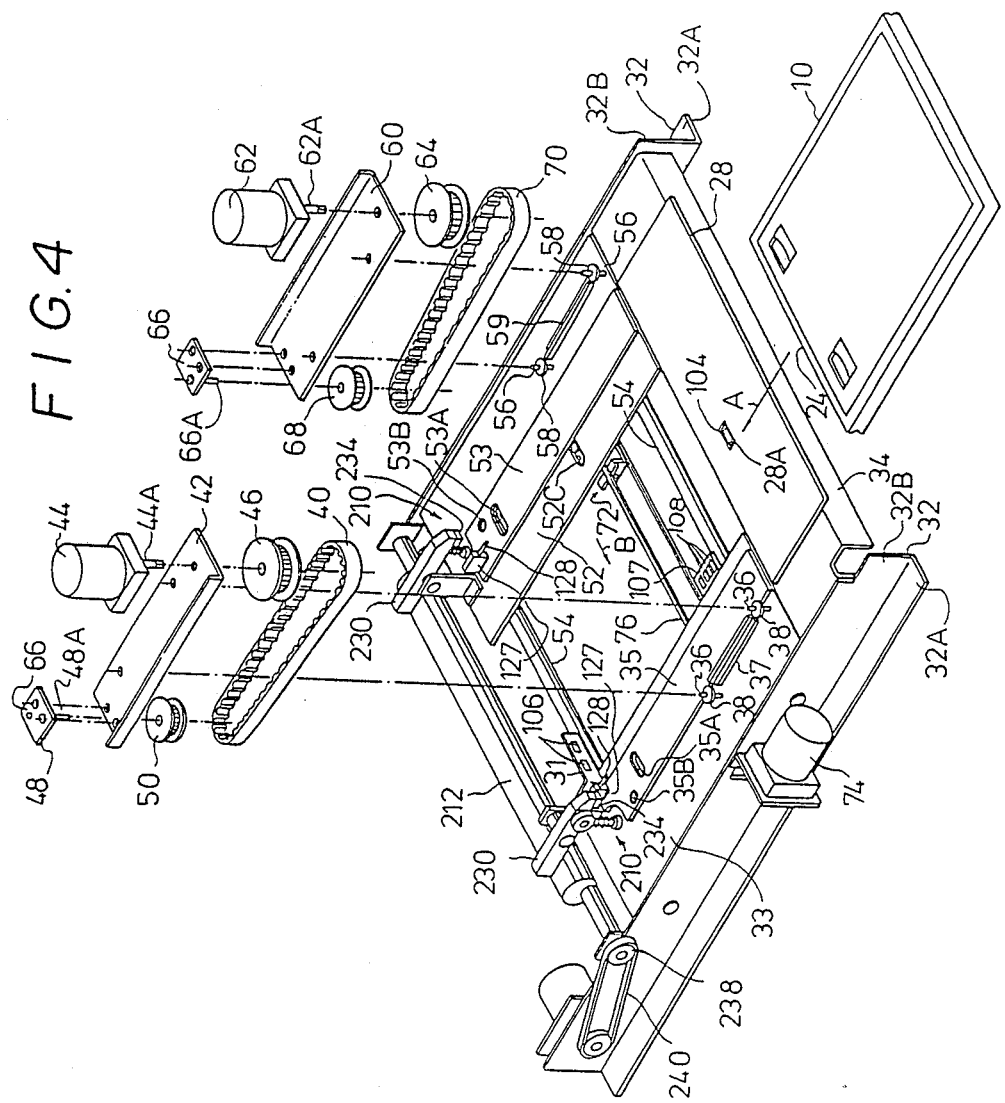
FIG. 4 is a diagrammatic perspective view, partially in exploded form, of the X-ray film cassette opener shown in FIG. 3.

FIG. 3 is a plan view of one embodiment of the X-ray film cassette opener of the present invention, and FIG. 4 is an exploded perspective view of the same.

A pair of base frames 32 are disposed on a base (not shown), parallel to each other and parallel to the direction in which the X-ray film cassette 10 is inserted (as indicated by an arrow A). These base frames 32 each have an L-shaped cross section, and one portion 32A of each of the L-like configurations is fixed to the base (not shown) while the other portion 32B is shaped to assume an upright form. A bracket 34 is interposed between the end portions of the pair of base frames 32 adjacent to the side on which the X-ray film cassette 10 is inserted.

The edge portions of the planar bracket 34 are bent downwardly (as viewed in FIG. 4) at right angles at the two ends and along one side. The downwardly bent ends are fixed to the upright portions 32B of the base frames 32 in face-to-face relationship. The downwardly bent side is located at one end of the respective base frames 34 adjacent to the side on which the X-ray film cassette 10 is inserted. A planar guide 28 is fixed on the top of the bracket 34 at an intermediate portion thereof. In cooperation with a cover member (not shown), the guide 28 defines part of an inlet through which the cassette 10 is inserted. The cassette 10 is inserted in the direction indicated by the arrow A while being slid over the top surface of the guide 28.

A stationary planar base 33 is mounted on one of the pair of base frames 32 (on the left as viewed in FIG. 3) along the longitudinal axis of that base frame 32.

Figure 5:
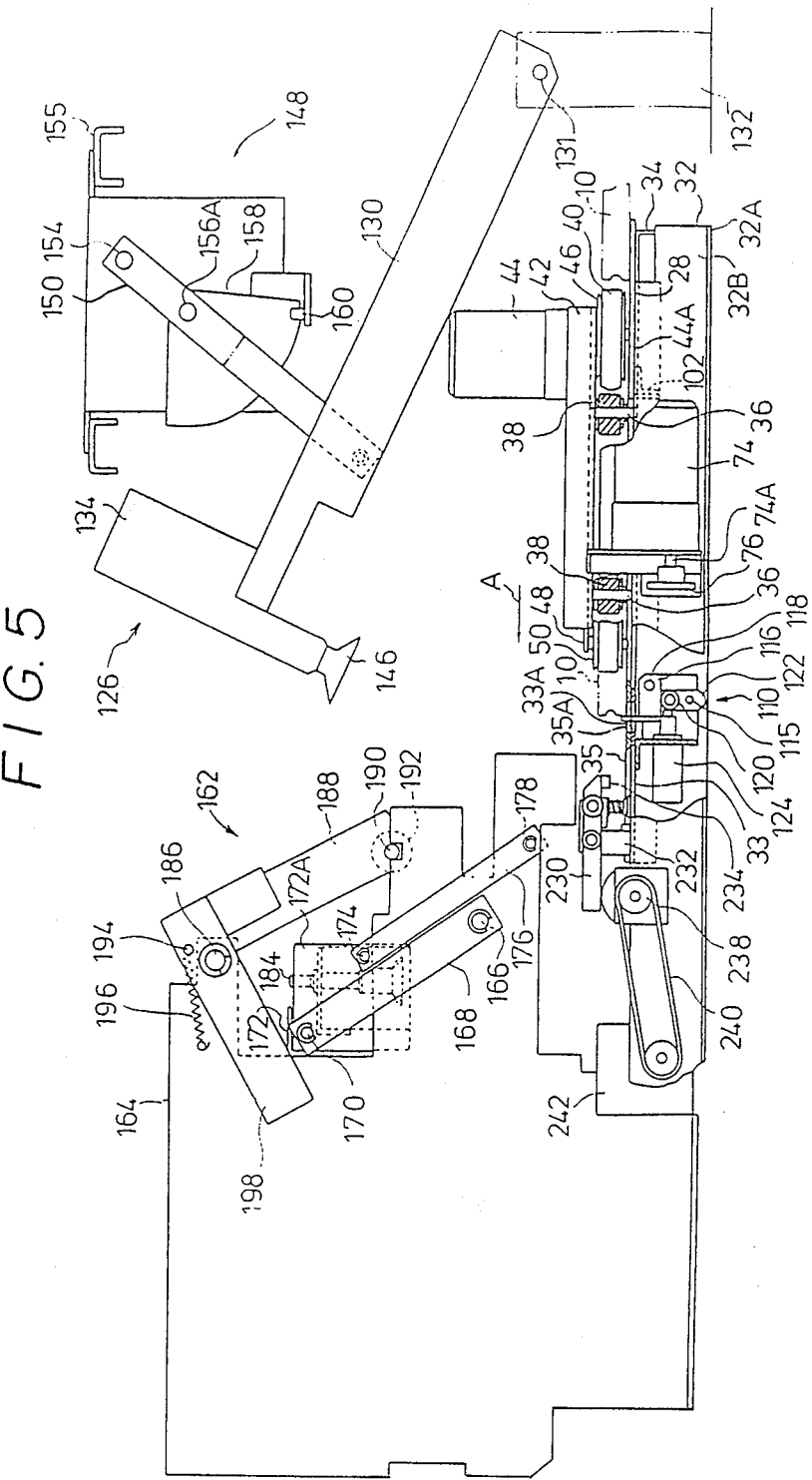
FIG. 5 is a diagrammatic side elevation of the embodiment as viewed from the left side of FIG. 3, with portions broken away and in section for the sake of clarity, and illustrates the positional relationship between a lid opening mechanism, a film unloading mechanism, and an X-ray film cassette guiding device.

As shown in FIGS. 3 through 5, the stationary planar base 33 is set back from the position of the bracket 34 in the direction of the arrow A, and the top surface of the planar base 33 is flush with the top surface of the bracket 34. Two vertical shafts 36 extend from the top of the stationary base 33, and one of them is located at a longitudinally intermediate position on the stationary base 33 while the other is located at a position nearer to the cassette inserting inlet.

Rollers 38 are respectively fitted onto an axially intermediate portion of each of the two vertical shafts 36 for rotation about an axis thereof. A motor bracket 42 having a rectangular and planar form is horizontally supported by the upper ends of the two vertical shafts 36. A motor 44 is mounted in an upright posture on the end portion of the motor bracket 42 adjacent to the cassette inserting inlet. The motor 44 has a drive shaft 44A which extends vertically downwardly through a corresponding through-hole in the motor bracket 42 into the space between the motor bracket 42 and the bracket 34. A pulley 46 around which a timing belt (to be described later) is looped is fixed to the end of the thus-extending drive shaft 44A. The height of the pulley 46 from the stationary base 33 coincides with the height of each of the rollers 38 from the stationary base 33.

A plate 48 is fixed to the motor bracket 42 at an even more inward portion thereof in the direction in which the cassette 10 is inserted. A shaft 48A extends vertically downwardly from the plate 48, and a pulley 50 around which the timing belt is looped is supported for rotation about the axis of the shaft 48A. A timing belt 40 is disposed between the pulley 50 and the pulley 46. The timing belt 40 has a flat outer surface and an inner surface provided with evenly spaced teeth. When the cassette 10 is inserted through the inserting inlet, the flat outer surface of the straight portion (the right-hand portion in FIG. 3) of the belt 40 defined between the pulley 46 and the pulley 50 serves as an abutment surface which abuts against a corresponding side of the cassette 10.

The rollers 38 abut against the inner surface of this straight portion, and a belt guide 37 is disposed parallel to the straight portion of the belt 40. The rollers 38 and the belt guide 37 cooperate with each other to support and guide the timing belt 40. This timing belt 40 is made of, for example, urethane rubber.

As shown in FIGS. 3 and 4, a guide plate 35 is fixedly disposed on the top of the stationary base 33 in the direction parallel to the direction in which the cassette 10 is inserted. The top surface of the guide plate 35 is flush with that of the guide 28.

Figure 6:
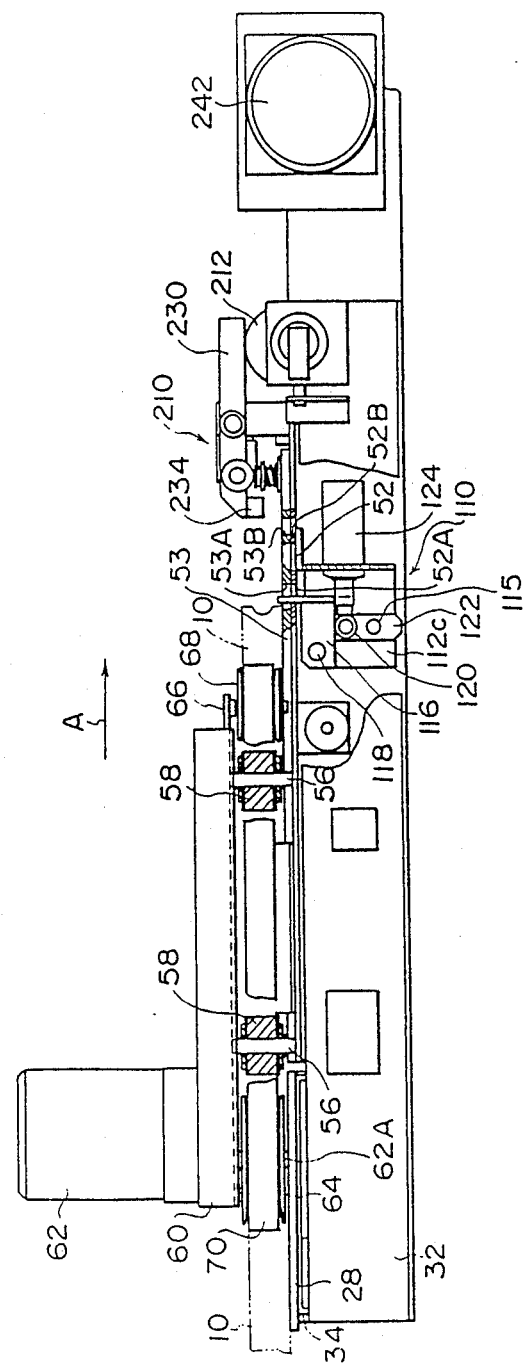
FIG. 6 is a diagrammatic side elevation of the embodiment as viewed from the right side of FIG. 3.

As shown in FIGS. 3, 4 and 6, a movable base 52 is disposed parallel to the portion 32B and adjacent to the other of the pair of base frames 32 (the right-hand one as viewed in FIG. 3). The movable base 52 is guided by a pair of base guides 54 for movement toward and away from the timing belt 40 (the stationary base 33). Between the base frames 32, the base guides 54 are so disposed that their longitudinal axes are parallel to each other and perpendicular to the direction indicated by the arrow A. The opposite ends of each of the base guides 54 are fixed to the base frames 32.

As shown in FIG. 4, two vertical shafts 56 extend from the top of the movable base 52, and one of them is located at a longitudinally intermediate position on the movable base 52 while the other is located at a position nearer to the right-hand portion (in FIG. 3) of the cassette inserting inlet.

Rollers 58 are fitted onto an axially midway portion of each of the two vertical shafts 56 for rotation about an axis thereof. A motor bracket 69 having a rectangular and planar form is horizontally supported by the upper ends of the two vertical shafts 56. A motor 62 is mounted in an upright posture on the end portion of the motor bracket 60 adjacent to the cassette inserting inlet. The motor 62 has a drive shaft 62A which extends vertically downwardly through a corresponding through-hole in the motor bracket 60 into the space between the motor bracket 60 and the bracket 34. A pulley 64 around which another timing belt (to be described later) is looped is fixed to the end of the thus-extending drive shaft 62A. The height of the pulley 64 from the movable base 52 coincides with the height of each of the rollers 58 from the movable base 52.

A plate 66 is fixed to the motor bracket 60 at an even more inward portion thereof in the direction in which the cassette 10 is inserted. A shaft 66A extends vertically downwardly from the plate 66, and a pulley 68 around which the timing belt is looped is supported for rotation about the axis of the shaft 66A. A timing belt 70 is disposed between the pulley 64 and the pulley 68. The timing belt 70 has the same structure as the aforesaid timing belt 40. Similarly, the rollers 58 abut against the inner surface of the straight portion of the timing belt 70, and a belt guide 59 is disposed parallel to this straight portion. The rollers 58 and the belt guide 59 cooperate with each other to support and guide the timing belt 70.

The timing belt 70 and the timing belt 40, the pulley 50 and the pulley 68, and the pulley 46 and the pulley 64 are symmetrically arranged in plan view, respectively.

The timing belt 70 positionally corresponds to the timing belt 40, and is so arranged that the straight portion (the left-hand portion in FIG. 3) of the belt 70 defined between the pulley 68 and the pulley 64 is made to abut against a corresponding side of the cassette 10 which is inserted, thereby firmly holding the cassette 10 in cooperation with the timing belt 40. Similarly to the timing belt 40, the timing belt 70 is made of, for example, urethane rubber.

The top surface of the movable base 52 is flush with that of the bracket 34, and a guide plate 53 is fixed to this top surface in the direction parallel to the direction in which the cassette 10 is inserted. The top surface of the guide plate 53 is flush with that of the guide 28.

Figure 7:
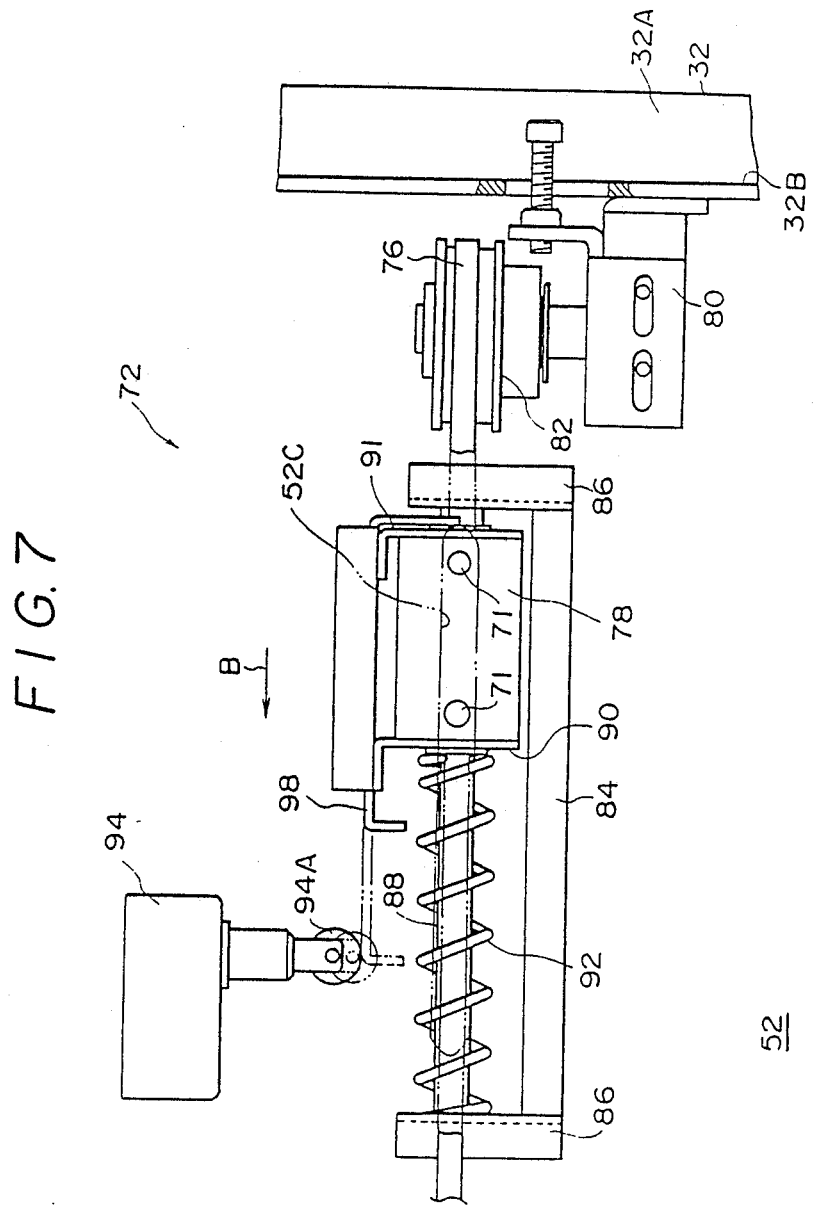
FIG. 7 is a diagrammatic enlarged view, in cross section along the line VII—VII of FIG. 8, of a portion of the embodiment shown in FIG. 3, and illustrates a cassette pressing mechanism.
Figure 8:
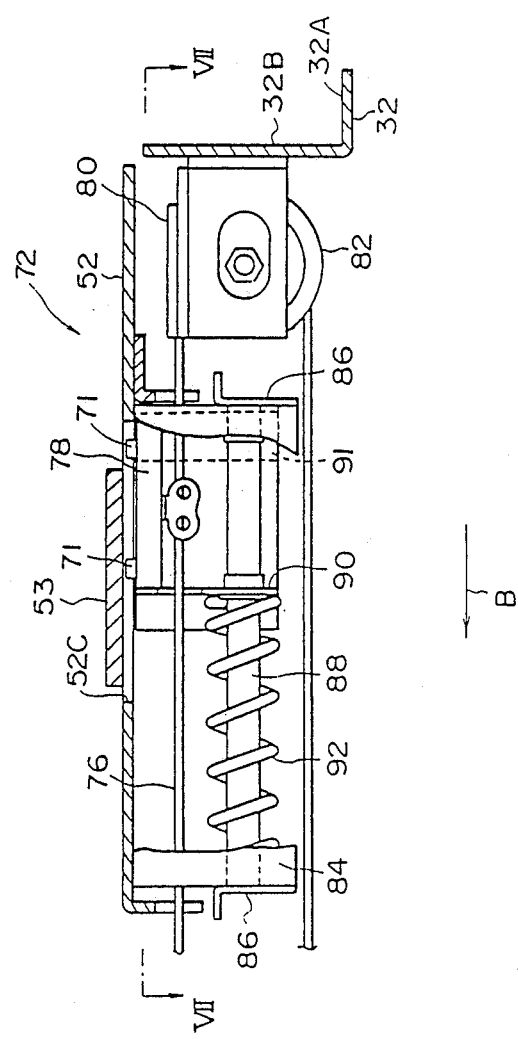
FIG. 8 is a bottom end view of the cassette pressing mechanism shown in FIG. 7.

As shown in FIG. 3, a cassette pressing mechanism 72 is located on the bottom surface of the movable base 52 at a longitudinally intermediate portion thereof. As clearly shown in FIGS. 7 and 8, in the cassette pressing mechanism 72, a bracket 78 is fixed to an endless belt 76. The belt 76 is looped around between a motor 74 disposed on a surface of one of the base frames 32 (refer to FIG. 3) and a pulley 82 mounted on the other base frame 32 through a position adjustment plate 80. Two guide pins 71 project upwardly from the top surface of the bracket 78. As shown in FIGS. 7 and 8, the pins 71 are inserted into a slot 52C formed in the movable base 52, and the slot 52C serves as a guide slot which allows the guide pins 71 to move with respect to the movable base 52 in the direction indicated by an arrow B (perpendicular to the direction in which the cassette 10 is inserted).

As shown in FIGS. 7 and 8, the cassette pressing mechanism 72 includes a block plate 84 which is disposed on the bottom surface of the movable base 52 such that the longitudinal axis of the block plate 84 is parallel to the axis of the belt 76. The block plate 84 extends vertically downwardly from the bottom surface of the movable base 52. Plates 86 each having an L-like cross section are mounted on the opposite ends of the block plate 84 which extends parallel to the straight portion of the belt 76. As shown in FIG. 7, each of the plates 86 extends perpendicular to the longitudinal axis of the block plate 84. A shaft 88 is disposed parallel to the longitudinal axis of the belt 76, and the opposite ends of the shaft 88 is fixed to the plates 86. The shaft 88 extends through plates 90 and 91 which are protrusively fixed to the opposite ends of the bracket 78 whose longitudinal axis is parallel to the straight portion of the belt 76. Therefore, the bracket 78 is guided by the shaft 88 for movement with respect to the movable base 52 in the direction indicated by an arrow B shown in each of FIGS. 7 and 8. A compressive coiled spring 92 is interposed between the plate 90 through which the shaft 88 extends and the plate 86 to which the shaft 88 is fixed. Therefore, the cassette pressing mechanism 72 is capable of moving with respect to the movable base 52 against the urging force of the compressive coiled spring 92 in the direction indicated by the arrow B.

Figure 9:
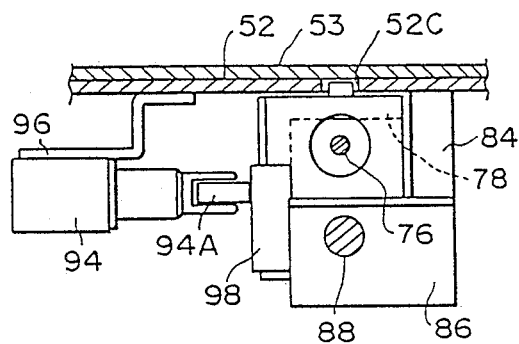
FIG. 9 is a side elevation of the cassette pressing mechanism as viewed from the left side thereof.

As shown in FIG. 9, a limit switch 94 is mounted on the bottom of the movable base 52 through a mounting bracket 96. The limit switch 94 is arranged to engage with a stopper plate 98 mounted on the bracket 78 when the bracket 78 moves with respect to the movable base 52 against the urging force of the compressive coiled spring 92 in the direction indicated by the illustrated arrow B. When the stopper plate 98 is brought into contact with a contact member 94A while the bracket 78 is being moved in the direction of the arrow B by the drive force transmitted through the belt 76 from the motor 74, the movement of the bracket 78 is stopped.

Therefore, when the X-ray film cassette 10 is inserted into the space between the timing belts 40 and 70, the compressive coiled spring 92 is compressed until the stopper plate 98 is brought into contact with the contact member 94A. In consequence, the cassette 10 is firmly held between the timing belts 40 and 70 by the urging force of the coiled spring 92.

Figure 10:
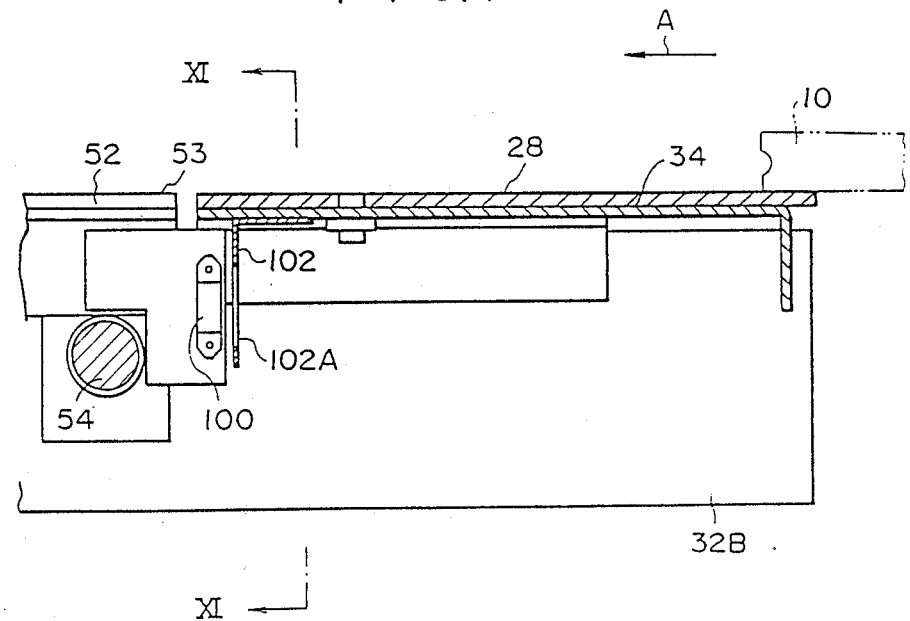
FIG. 10 is a section, taken along the line X—X of FIG. 3, illustrating a portion of the embodiment.

As shown in FIGS. 3 and 10, the movable base 52 which opposes the stationary base 33 has a sensor 100 at the end of the movable base 52 nearer to the cassette inserting inlet. The sensing surface of the sensor 100 is oriented toward the cassette inserting inlet (rightwardly in FIG. 10). In correspondence with the sensing surface of the sensor 100, a plate 102 having an L-like cross section is mounted on the bottom surface of the bracket 34 such that the longitudinal axis of the plate 102 is parallel to the direction of movement of the movable base 52 (in the direction indicated by the arrow B).

Figure 11:
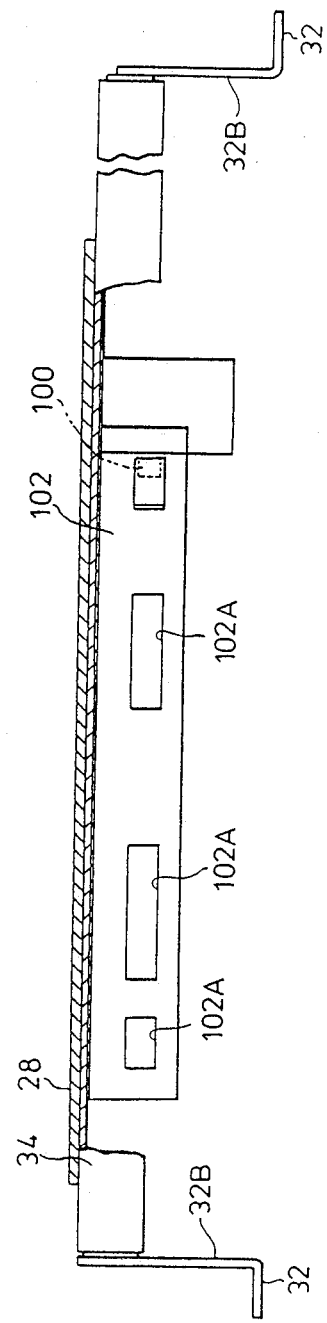
FIG. 11 is a section, taken along the line XI—XI of FIG. 10, illustrating a plate used for detecting the position of a movable base which is moving.

As shown in FIG. 11, a plurality of rectangular openings are formed in the plate 102 in such a manner that openings and non-openings alternate with each other along the longitudinal axis of the plate 102. Each of the through-holes 102A has a different size. When the sensing surface of the sensor 100 is positioned at one edge of each of the through holes 102A, the position of the movable base 52 is detected.

As shown in FIG. 3, a through hole 28A is formed in the guide 28 at an intermediate position thereof, and the sensing surface of a sensor 104 mounted on the bracket 34 is exposed in the upper opening of the through hole 28A. The sensing surface is flush with the top surface of the guide 28. The sensor 104 is arranged to detect the fact that the X-ray film cassette 10 has been inserted through the inserting inlet.

As shown in FIGS. 3 and 4, two sensors 106 are fixed to the stationary base 33 through a mounting plate 105 at an inward portion in the direction in which the cassette 10 is inserted. These sensors 106 are so disposed that their sensing surfaces are oriented toward the cassette inserting inlet. When a leading edge 24 of the cassette 10 is brought into contact with the sensors 106, the position of the leading edge 24 of the cassette 10 is detected.

At a position below a locus along which the cassette 10 is inserted, a plurality of optical sensors 108 are attached through a mounting plate 107 to the end portions of the stationary base 33 nearer to the cassette inserting inlet. Four sensors 108 are disposed in the direction of movement of the cassette 10 with their sensing surfaces facing upwardly. These sensing surfaces are flush with the top surface of the stationary base 33. When a trailing edge of the cassette 10 is located at a position which corresponds to any of the four sensors, the position of the trailing edge of the cassette 10 is detected through the ON or OFF state of each of the sensors. Thus, the size of the cassette 10 between the leading and trailing edges is detected.

Therefore, the sensors 100 and 108 are used to detect the size (the length and width) of the cassette 10.

Figure 12:
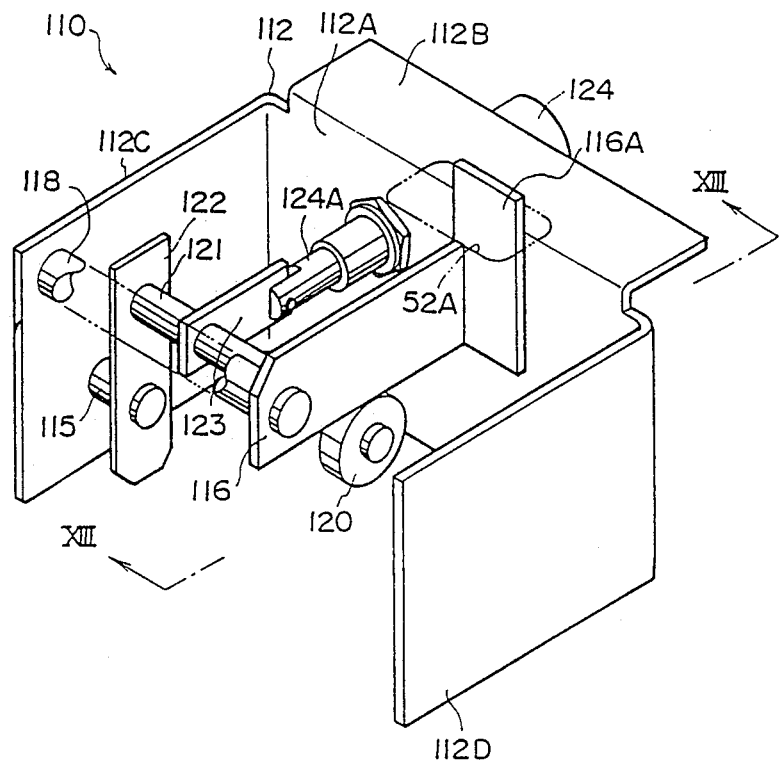
FIG. 12 is a detailed perspective view of a stopper mechanism used in the embodiment of the present invention.
Figure 13:
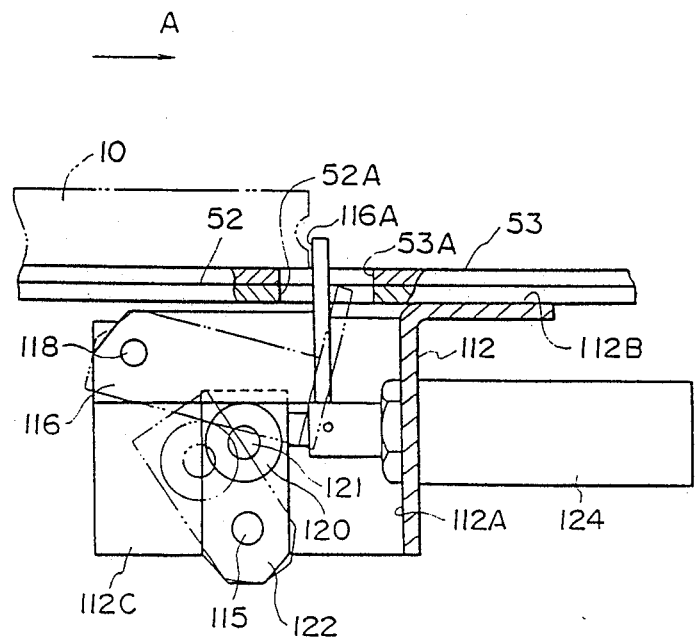
FIG. 13 is a diagrammatic section taken along the line XIII—XIII of FIG. 12 and illustrates on an enlarged scale a portion of the embodiment shown in FIG. 6.

Referring now to FIGS. 6, 12 and 13, stopper mechanisms 110 will be described below which are arranged to determine a lid opening position which allows the lid 14 to be released from the X-ray film cassette 10 to a fully open position.

The stopper mechanisms indicated generally at 110 are respectively disposed on the bottom surface of each of the stationary base 33 and the movable base 52, at a longitudinally intermediate position thereof and in symmetrical relationship with respect to each other.

First, a description is made with respect to the stopper mechanism 110 mounted on the bottom surface of the movable base 52. As shown in FIGS. 12 and 13, the stopper mechanism 110 includes a base bracket 112 with a rectangular-C-like cross section which has a bottom portion 112A, a pair of side portions 112C and 112D each extending from the bottom portion 112A, and a mounting portion 112B which is bent in the direction opposite to the directions in which the side portions 112C and 112D extend. The stopper mechanism 110 is mounted through the mounting portion 112B on each of the bottom surfaces of the stationary base 33 and the movable base 52.

A pin 118 has one end fixed to the side portions 112C of the base bracket 112 and the other end facing the side portion 112D. One end of a stopper plate 116 is supported for pivotal movement about the latter end of the pin 118. The other end portion of the stopper plate 116 is bent toward the side portion 112D, substantially perpendicular to the longitudinal axis of the stopper plate 116. A stopper portion 116A extends vertically upwardly from the perpendicular bent portion. The stopper portion 116A is located at a position which corresponds to a through-hole 52A formed in the movable base 52 and a through-hole 53A formed in the guide plate 53. A roller 120 is maintained in contact with an intermediate portion of the lower edge of the stopper plate 116. The roller 120 is supported at one end of a pin 121 for rotation about the axis thereof. The proximal end of the pin 121 is fixed to the upper end portion of a rotatable block plate 122. The lower end portion of the rotatable block plate 122 is supported at one end of a pin 115 for rotation about the axis thereof. The proximal end of the pin 115 is fixed to the side portion 112C. The rotatable block plate 122 is urged counterclockwise about the pin 115 as viewed in FIG. 13 by the action of a tension coiled spring (not shown).

Also, as shown in FIG. 12, a planar linkage member 123 is secured to an axially intermediate position of the pin 121, and the pin 121 is linked with a shaft 124A of a solenoid 124 through the linkage member 123. The solenoid 124 is mounted on the bottom portion 112A.

In a normal state (wherein the solenoid 124 is not energized), the rotatable plate 122 is urged by the action of the tension coiled spring (not shown) to move to the position shown by a two-dot chain line in FIG. 13. In this state, as illustrated, the roller 120 is rotated counterclockwise about the pin 115, and the stopper plate 116 is rotated clockwise about the pin 118. Thus, the stopper portion 116A of the stopper plate 116 is retracted into the through-hole 52A formed in the movable base 52, that is, the stopper portion 116A does not project through the through-hole 53A.

When the solenoid 124 is energized, the shaft 124A is drawn into the solenoid 124 to cause the rotatable block plate 122 to rotate about the pin 115 in the clockwise direction as viewed in FIG. 13. Thus, the roller 120 is slid along the lower edge of the stopper plate 116 to cause the stopper plate 116 to rotate about the pin 118 in the counterclockwise direction as viewed in FIG. 13. Thus, the stopper portion 116A of the stopper plate 116 is passed through the through-hole 52A, and the top end portion of the stopper portion 116A is projected upwardly through the through-hole 53A. Therefore, it is possible to determine the position of the cassette 10 and hence the position at which the lid 14 is fully opened, by moving the X-ray film cassette 10 in the direction of the arrow A in FIG. 13 until its leading edge comes into contact with the thus-projected top end portion of the stopper plate 116.

Similarly, the stopper mechanism 110 is mounted on the bottom surface of the stationary base 33 as well. In this arrangement, the stopper portion 116A of the stopper plate 116 is allowed to pass through a through-hole 33A (FIG. 5) formed in the stationary base 33 and thus the top end portion of the stopper portion 116A is projected upwardly through a through-hole 35A (FIG. 5) formed in the guide plate 35. The respective stopper mechanisms disposed on the bottom surfaces of the stationary base 33 and the movable base 52 are actuated at the same time to maintain the leading edge of the X-ray film cassette 10 at a right angle with respect to the direction indicted by the arrow A, thereby locating the cassette 10 at the position at which the lid 14 is opened.

As shown in FIGS. 3 and 4, a pin 128 is attached through a mounting block 127 to both the guide plate 35 on the stationary base 33 and the guide plate 53 on the movable base 52 at an inward portion thereof in the direction in which the cassette 10 is inserted. These pins 128 are located parallel to each in such a manner that the longitudinal axes thereof are substantially perpendicular to the longitudinal axis of the inlet through which the cassette 10 is inserted. The positions of the pins 128 correspond to the positions of the through-holes 18 formed in the leading end of the cassette 10.

Therefore, the pins 128 are inserted into the pair of through-holes 18 to press the corresponding latches 20 in the opposite direction to that of the arrow A, thereby disengaging the latches 20 from the inner step 16B of the frame 16.

The following is a description of a lid opening mechanism 126 for opening the lid 14 of the X-ray film cassette 10.

Figure 14:
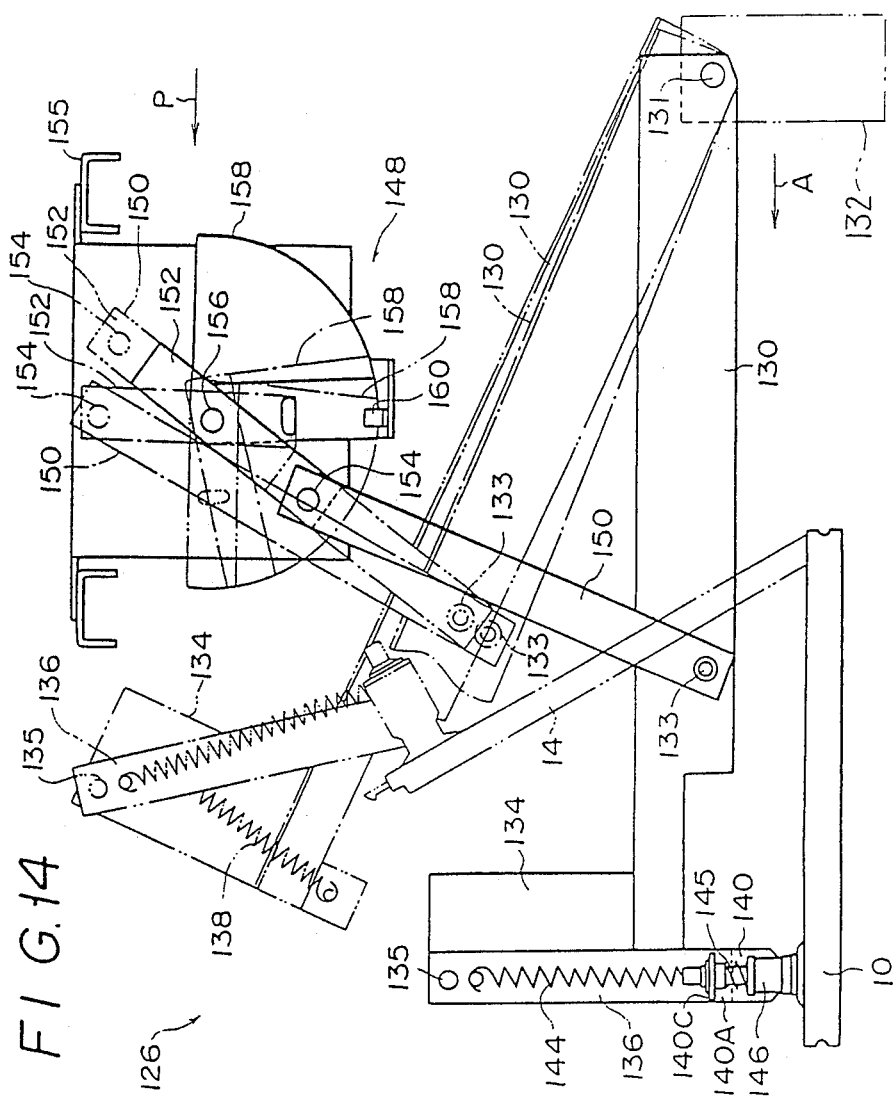
FIG. 14 is a fragmentary side elevation illustrating the operation of a lid opening mechanism which constitutes a part of the embodiment.
Figure 15:
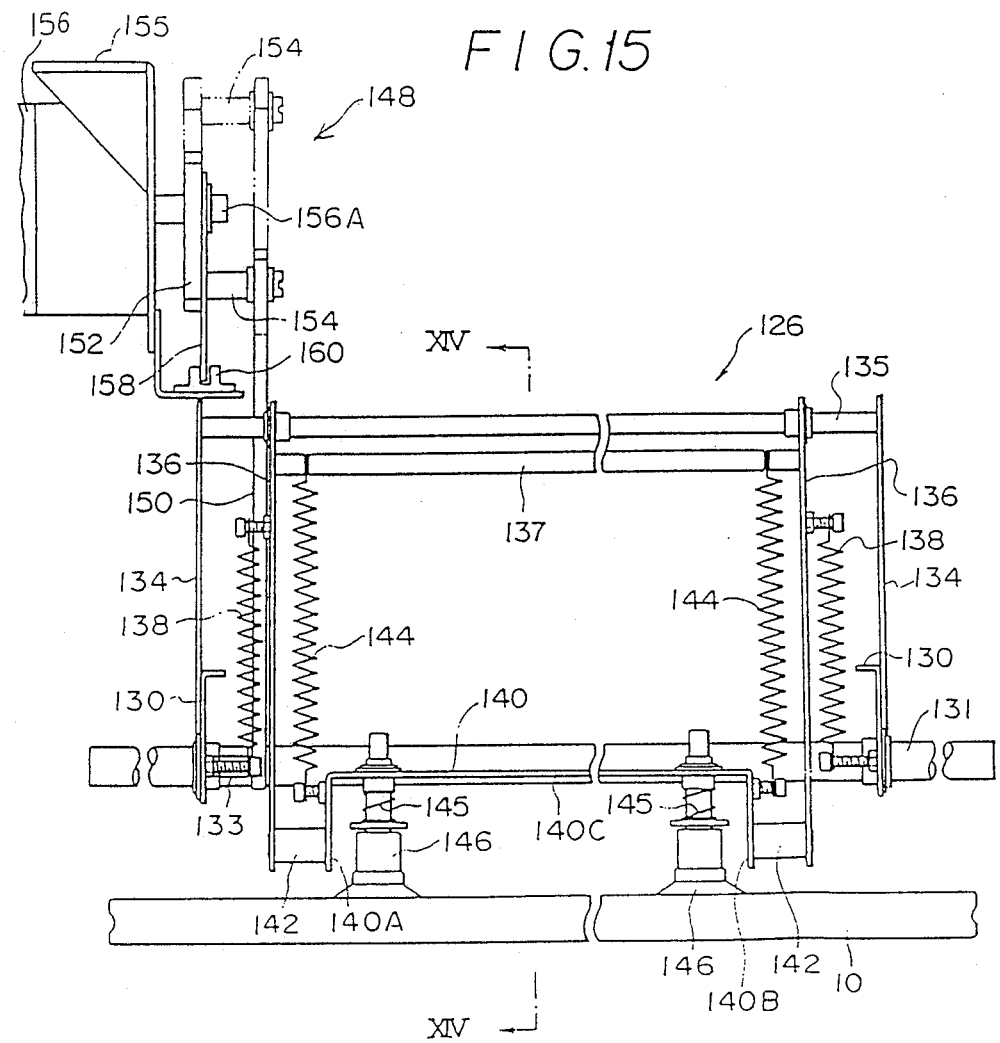
FIG. 15 is a side elevation of the lid opening mechanism of FIG. 14 as viewed from the left side thereof.

As shown in FIGS. 5, 14, and 15, the lid opening mechanism 126 for opening the lid 14 is located generally above the cassette 10 after it has been inserted. The lid opening mechanism 126 includes a pair of swingable arms 130 which are located parallel to each other and parallel to the length of the cassette 10 which is inserted in the direction indicated by the arrow A. The pair of swingable arms 130 are supported pivotally at their respective proximal ends by a bracket 132, which is disposed on a base (not shown) in an upright manner. A plate 134 is mounted on each of the free ends of the swingable arms 130 in such a manner that the longitudinal axes of the plate 134 and the swingable arm 130 intersect each other at a right angle. As clearly shown in FIG. 15, a shaft 135 interconnects these plates 134, and a pair of linkage arms 136 are supported for pivotal movement at their respective proximal ends about an intermediate portion of the shaft 135.

Adjacent ones of the plates 134 and the linkage arms 136 are connected by each of the tension coiled springs 138 disposed therebetween. Each of the tension coiled springs 138 urges the corresponding one of the linkage arms 136 to locate the length thereof perpendicularly with respect to the length of the corresponding one of the swing arms 130 in such a state as that shown by solid lines in FIG. 14. More specifically, when the linkage arms 136 are rotated about the shaft 135 from the state shown by the solid lines in FIG. 14 to the position shown by broken lines in the same Figure, the tension coiled springs 138 are subjected to tensile forces that serve to return the linkage arms 136 to the state shown by the solid lines in FIG. 14.

A suction-cup mounting bracket 140 with a planar form has opposite end portions 140A and 140B which are bent downwardly as viewed in FIG. 15, and the opposite end portions 140A and 140B of the bracket 140 are pivotally supported through pins 142 by one end of the respective linkage arms 136. A shaft 137 connects together the linkage arms 136, and a tension coiled spring 144 is disposed between each end of the shaft 137 and the corresponding ends 140A and 140B of the suction-cup mounting bracket 140. The tension springs 144 apply urging forces which act to cause the linkage arms 136 and the suction-up mounting brackets 140 to assume the state shown by the solid lines in FIG. 14, that is, whereby a base surface 140C of the suction-cup mounting bracket 140 is made perpendicular to the longitudinal axes of the linkage arms 136.

A plurality of suction cups 146 are attached to the base surface 140C of the suction-cup mounting bracket 140 across the width of the cassette 10 and are slidable by a slight amount in the direction perpendicular to the base surface 140C. A compressive coiled spring 145 urges each of the suction cups 146 in a direction away from the base surface 140C while the suction surface of each suction cup 146 is maintained parallel with respect to the base surface 140C. The suction cups 146 attract the lid 14 by negative pressure created by a negative-pressure source (not shown).

Accordingly, as shown by the solid lines in FIG. 14, when the swingable arms 130 assume their substantially horizontal position, the lid 14 of the X-ray film cassette 10 which is inserted is held by suction. In addition, even when the swingable arms 130 are moved upwardly as shown by imaginary lines, the bracket 140 which carries the suction cups 146 pivots about the axis defined by the pins 142 to keep the lid 14 held by suction. Even if the X-ray film cassette 10 is moved further inwardly in the direction of its insertion with the lid 14 opened, the suction cups 146 and the linkage arms 136 pivotally move to prevent substantial variations in the angle at which the lid 14 is opened.

Also, it is preferable that, when the lid 14 is fully opened, the linkage arms 136 be located at an angle close to 90 degrees with respect to the direction in which the cassette 10 is inserted.

A pin 133 is fixed at its proximal end to an axially intermediate position of one of the swingable arms 130 in such a manner as to extend toward the other swingable arm 130. One end of a swingable arm 150 is supported pivotally at one end of the pin 133. The other end of the swingable arm 150 is attached through a pin 154 to a drive arm 152 of a drive device 148 in such a manner that the swingable arm 150 and the drive arm 152 are rotatable with respect to each other. A drive shaft 156A of a motor 156 is fitted into a hole formed in the drive arm 152, and is fixed at its intermediate portion with respect to the drive arm 152. The motor 156 is mounted on a motor bracket 155 fixed to a frame (not shown). Accordingly, when the drive shaft 156A of the motor 156 rotates, the torque of the motor 156 is transmitted through the drive arm 152 and the swingable arm 150 to the swingable arm 130 to cause the swingable arms 130 to rotate about the pins 131.

Figure 16:
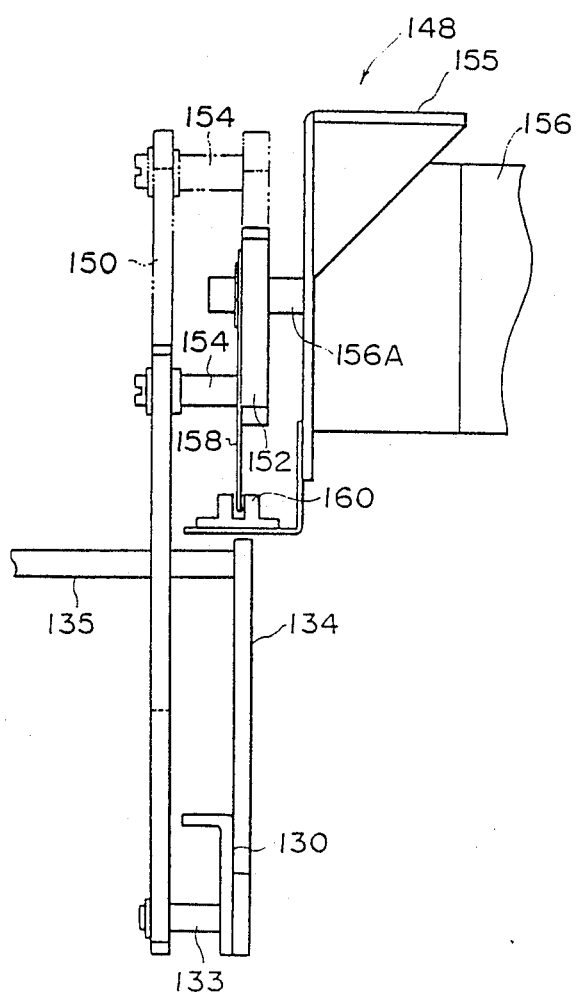
FIG. 16 is a view taken in the direction of an arrow P of FIG. 14 illustrating a detail of a drive device for the lid opening mechanism.

FIG. 16 is a side elevation of the drive device 148, taken in the direction indicated by an arrow P of FIG. 14. A sectorial plate 158 is attached to the drive shaft 156A of the motor 156, and sensor means 160 is disposed such as to sandwich a portion of the arcuate periphery of the sectorial plate 158. When the arcuate periphery of the plate 158 is sandwiched by the sensor means 160, the motor 156 is actuated. When that periphery leaves the sensor means 160, the motion of the motor 156 is stopped. Thus, the angle of rotation of the swingable arms 130 is controlled.

Figure 17:
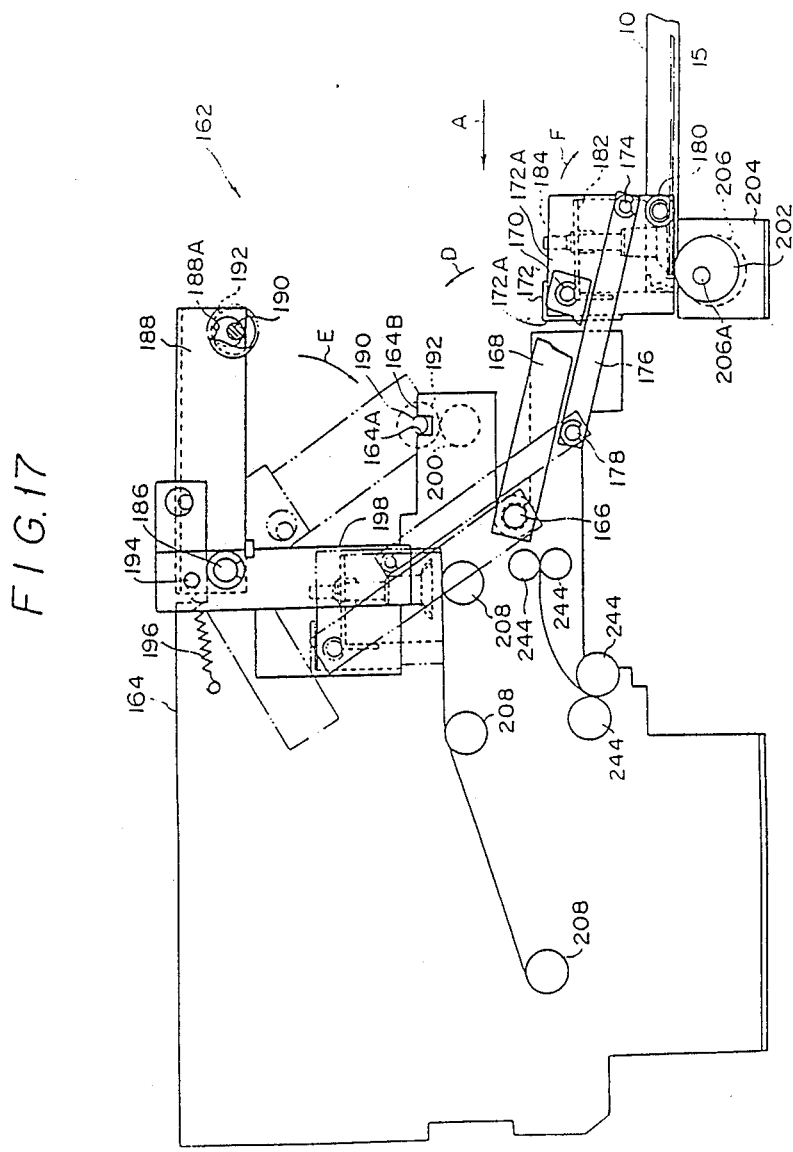
FIG. 17 is a side elevation, with portions omitted for the sake of clarity, illustrating the operation of an X-ray film unloading device which constitutes a part of the embodiment.
Figure 18:
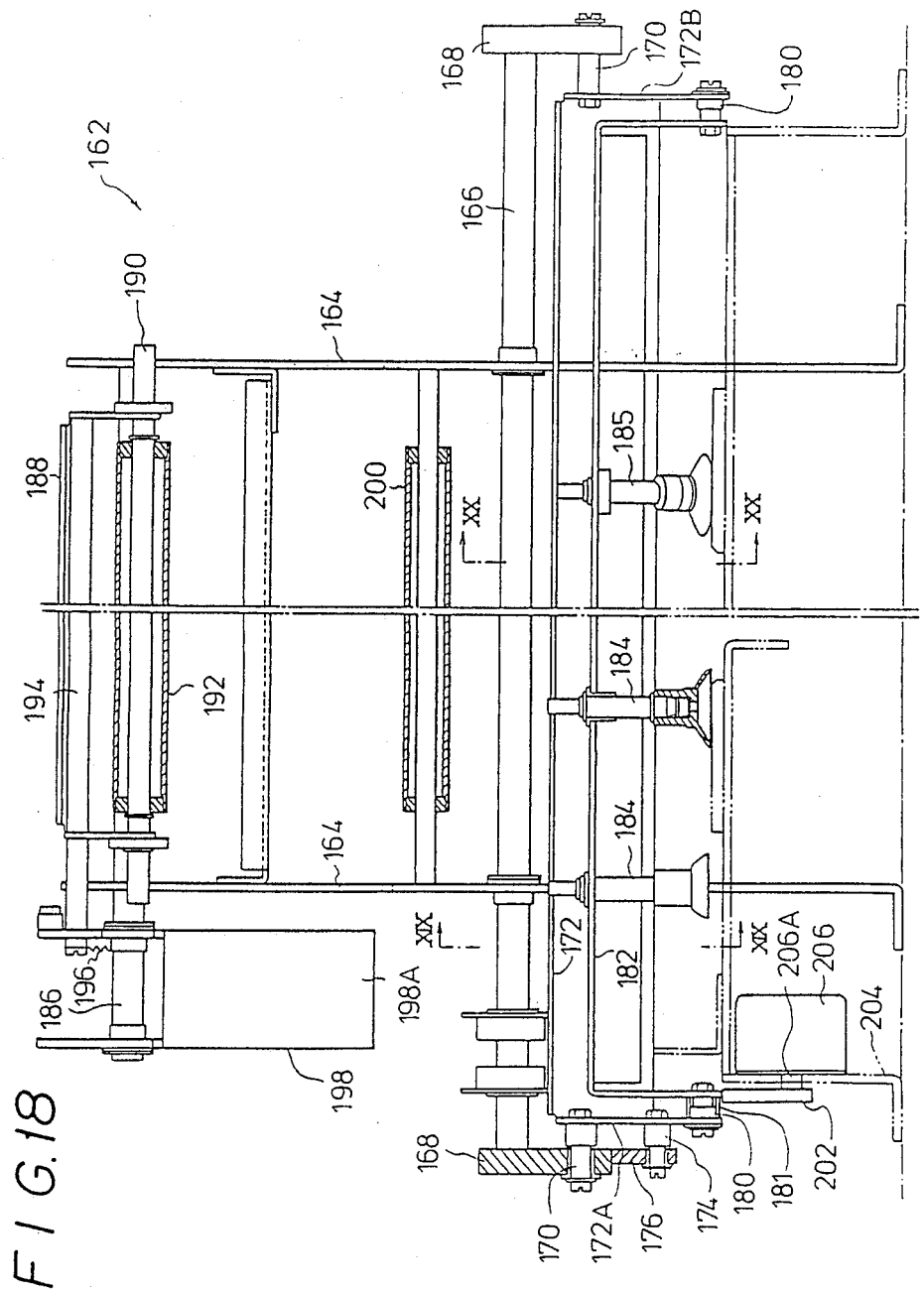
FIG. 18 is a diagrammatic elevation of the film unloading device as viewed from the right side thereof, with portions omitted and in section for the sake of clarity.

Referring now to FIGS. 17 and 18, an X-ray film unloading device 162 is described below arranged to unload the exposed X-ray film 15 which is accommodated in the cassette 10. FIG. 17 is a side elevation of the X-ray film unloading device 162, and FIG. 18 is a front elevation of the device 162 taken in the direction in which the cassette 10 is inserted. The X-ray film unloading device 162 is disposed at an inward position in the direction in which the cassette 10 (see FIG. 5) is inserted.

The shaft 166 shown in FIG. 18 is disposed across the width of the cassette 10 (in the direction perpendicular to the direction in which the cassette 10 is inserted). The shaft 166 is rotatably supported at its two intermediate portions by a pair of side plates 164 mounted on a base (not shown) in an upright manner. The opposite ends of the shaft 166 are each fixed to one end of a respective arm 168. The other ends of the arms 168 pivotally support the corresponding end portions 172A and 172B of a movable plate 172 which are bent downwardly as viewed in FIG. 18.

One end of a support plate 176 is pivotally secured through a pin 174 to the end portion 172A of the movable plate 172. The other end of the support plate 176 is pivotally secured through a pin 178 to a frame (not shown) mounted in an upright manner on a base (not shown). The axis-to-axis distance between the pin 178 and the pin 174 is equal to that between the shaft 166 and a pin 170, and the axis-to-axis distance between the pin 178 and the shaft 166 is equal to that between the pin 174 and the pin 170. Therefore, the support plate 176, the corresponding one of the arms 168, and the end portions 172A constitute in combination a parallel link mechanism.

A plurality of suction cups 184 are attached to a suction-cup mounting plate 182 which is bent downwardly at its opposite ends as viewed in FIG. 18. Each of the opposite bent portions of the plate 182 is pivotally secured through a pin 180 to a corresponding one of the opposite end portions 172A and 172B of the movable plate 172. The suction-cup mounting plate 182 are forced b the gravity of its own weight to rotate counterclockwise as viewed in FIG. 17 about the axis defined by the pins 180. However, a stopper 181 fitted around one of the pins 180 prevents the plate 182 from rotating in the state shown in FIG. 17 in which the longitudinal axis of the suction cup 184 is perpendicular to the surface of the X-ray film 15.

Accordingly, when the shaft 166 is rotated by the drive force of a drive source (not shown) in the direction indicated by an arrow D in FIG. 17, the parallel link mechanism operates as follows. The arm 168 is rotated in the direction of the arrow D about the shaft 166 and the support plate 176 is also rotated in the same direction. Thus, the movable plate 172 and the suction-cup mounting plate 182 are rotated in the direction of the arrow D while their respective postures are being maintained as shown in FIG. 17.

At the top end portions of the two side plates 164 disposed on the base (not shown) in an upright manner, a shaft 186 is supported at opposite ends thereof for rotation about its axis. A roller support plate 188, which is bent downwardly as viewed in FIG. 18 at its opposite end portions, is fixed to the shaft 186 through these opposite bent portions. Through-holes 188A each having a diameter greater than a roller shaft 190 are formed in the opposite bent portions of the roller support plate 188 at positions thereof nearer to the cassette inserting inlet, and the opposite end portions of the roller shaft 190 are inserted in the through-holes 188A. Thus, the roller shaft 190 is held loosely in the through-holes 188A. A roller 192 is rotatably fitted around an intermediate portion of the roller shaft 190 so as to clamp the X-ray film 15 in a manner which will be described later.

A roller shaft 194 is supported at its opposite ends by the roller support plate 188, and the left-hand end of the shaft 194 (a viewed in FIG. 18) extends through the left-hand end portion of the roller support plate 188 and projects further leftwardly from the side plate 164. One end of a tension coiled spring 196 is connected to this projecting end, with the other end being fixed to a corresponding one of the side plates 164. Therefore, the roller support plate 188 is urged in the direction opposite to that indicated by an arrow E in FIG. 17.

The left-hand end of the shaft 186 (as viewed in FIG. 18), which extends through the side plate 164, is provided with an abutment plate 198. The abutment plate 198 is located in such a manner that a flat surface 198A thereof faces the inserting inlet through which the cassette 10 is inserted, and is supported for rotation about the shaft 186. A corner of the movable plate 172 is adapted to come into contact with the flat surface 198A. When the movable plate 172, after having been brought into contact the flat surface 198A, moves further inwardly in the direction of the arrow A, the abutment plate 198 is rotated about the shaft 186 in the direction of the arrow E in FIG. 17.

Accordingly, as the flat surface 198A or abutment plate 198 rotates in the direction of the arrow E, the roller support plate 188 is rotated in the same direction against the urging force of the tension coiled spring 196. Thus, the X-ray film 15 is clamped between the roller 192 and a drive roller 200 which is supported rotatably at its opposite ends by the side plates 164.

The opposite ends of the shafts 194 which provides support for the roller 192 extend through the side plates 164 in opposite directions, and are loosely supported within the through-holes 188A. Therefore, those opposite ends readily drop in rectangular cutouts 164A formed in the side plates 164 to determine the position of the roller 190.

The width of each of the cutouts 164A (its horizontal dimension as viewed in FIG. 17) is substantially equal to the external diameter of the roller shaft 190, and the depth of the same is such that, as shown by imaginary lines in FIG. 17, the roller shaft 190 is allowed to rise above the bottom of the cutout 164A when the roller shaft 190 is inserted in the cutout 164A, thereby bringing the periphery of the roller 192 into contact with the roller 200. Further, the size of each of the cutouts 164A is such that the roller shaft 190 of the roller 192 which abuts against the roller 200, that is, the roller shaft 190 located in the cutouts 164A is allowed to be spaced apart from the inner peripheries of the through-holes 188 when the shaft 166 and the arms 168 are rotated counterclockwise by the maximum amount possible as shown by the imaginary lines i FIG. 17. Thus, when the roller support plate 188 is rotated clockwise from the state shown by the solid lines in FIG. 17, the roller shaft 190 first comes into contact with an edge 164B adjacent to each of the cutouts 164A, and, as the roller support plate 188 rotates further clockwise, a force which acts horizontally as viewed in FIG. 17 is applied to the roller shaft 190 through the peripheries of the through-holes 188A, thereby causing the roller shaft 190 to drop into the cutouts 164A. Thus, the X-ray film 15 is clamped between the roller 192 and the roller 200 by a clamping force derived from the weight of the roller 192, whereby the film 15 is conveyed from the X-ray film cassette 10.

As shown in FIG. 18, the plurality of suction cups 184 are mounted on the suction-cup mounting plate 182 in the direction of the width of the cassette 10. The suction surface of each of the suction cups 184 is substantially parallel to the surface of the X-ray film 15 within the X-ray film cassette 10 which is inserted. In addition, a suction cup 185 is attached to the suction-cup mounting plate 184 in an inclined state such that the suction surface of the suction cup 185 faces the leading end of the X-ray film 15 within the cassette 10 as shown in FIG. 20.

Figure 21:
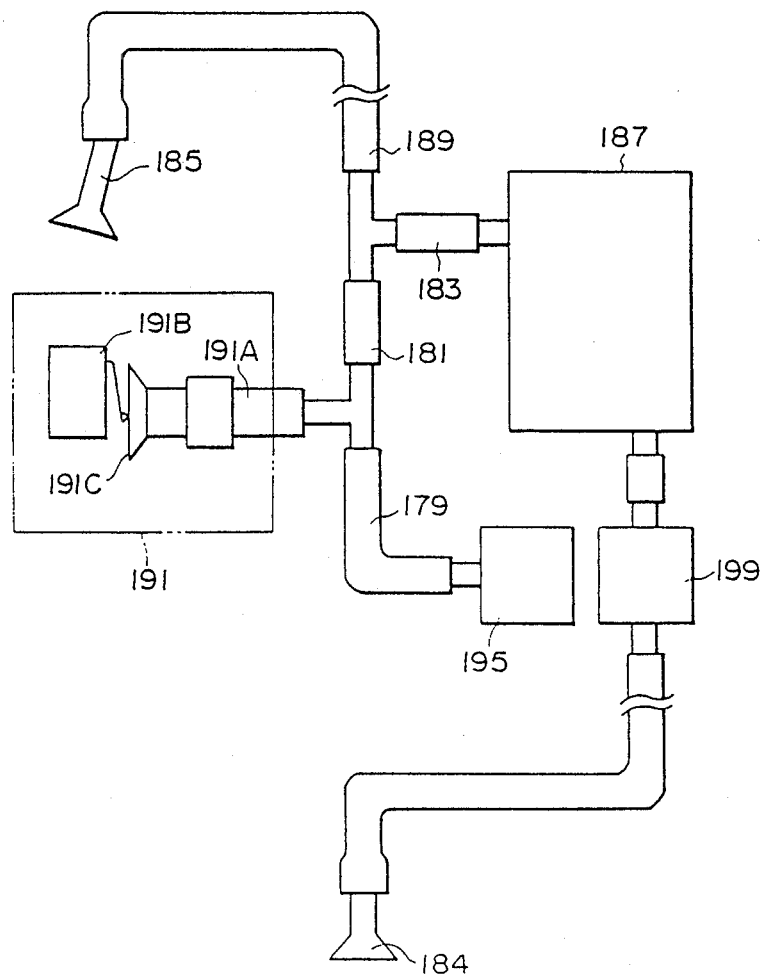
FIG. 21 is a diagram of a piping in the embodiment which connects a pump and suction cups and whose intermediate portion is connected to a negative-pressure sensor.

As shown in FIG. 21 which diagrammatically illustrates the piping between the suction cups 184, 185 and the pump 187, the suction cups 184 and 185 are connected to a pump 187 serving as a negative-pressure generating source. A pipe 183 is connected at one end thereof to a pump 187, and bifurcated at the other end. The suction cup 185 is connected by a pipe 189 to one of the bifurcated portions of the pipe 183. The other of the bifurcated portions is connected to one end of a pipe 181. The other end of the pipe 181 is bifurcated, and one of these bifurcated portions is connected to a negative-pressure sensor 191, while the other is connected to a solenoid valve 195 by a pipe 179.

The negative-pressure sensor 191 is constituted by a limit switch 191B and a pipe 191A which communicates with the pipe 181. A resilient film 191C is tensely disposed at one end of the pipe 191A. When the resilient film 191C is resiliently deformed by negative pressure generated within the pipe 191A, the presence of the negative pressure is detected through a contact member of the limit switch 191B.

The solenoid valve 195 is a valve adapted to communicate with the atmosphere so as to cancel the negative pressure.

The solenoid valves 184 are connected through the solenoid valve 199 to the pump 187. The solenoid valve 199 functions to control the supply of the negative pressure to the suction cups 184.

With this arrangement, it is possible to discriminate between the normal state wherein the X-ray film 15 is properly located and the anormalous state wherein the X-ray film 15 is not properly located because of malfunctions or the like.

Figure 19:
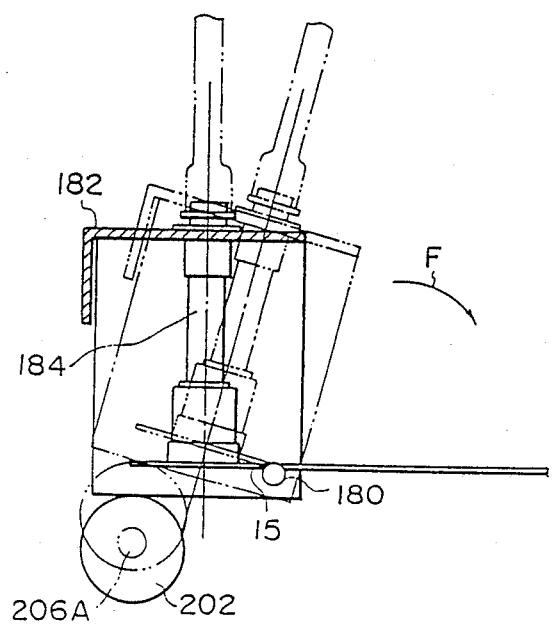
FIG. 19 is a fragmentary section taken along the line XIX—XIX of FIG. 18.

More specifically, in a case where negative pressure is transmitted to the suction cups 184 and 185 when the suction cups 184 are positioned in an upright posture as shown in FIG. 19, unless the X-ray film 15 is held by suction or unless the X-ray film 15 is accommodated in the cassette 10, a gap is formed between the surface of the X-ray film 15 and the suction surface of the suction cup 185 which is in advance inclined to allow leak of the negative pressure. Therefore, since the resilient film 191C is not deformed, the absence of the X-ray film 15 can be detected by the limit switch 191B.

On the other hand, in a case where the X-ray film 15 is held by suction, that is, in a case where the X-ray film 15 is accommodated in the cassette 10, the film 15 is held by the negative pressure supplied to the inclined suction cup 185. Therefore, the negative pressure within each of the pipes 189 and 191A is maintained, and the presence of the X-ray film 15 is detected by the limit switch 191B.

An eccentric cam 202 is maintained in contact with the lower edge of the left-hand end (in FIG. 18) of the suction-cup mounting plate 182. The eccentric cam 202 is fixed to a drive shaft 206 of a motor 206 supported on a frame 204 which is mounted on a base (not shown) in an upright manner.

The eccentric cam 202 is rotated while its outer periphery is being slid on the lower edge of the suction-cup mounting plate 182. In consequence, the suction-cup mounting plate 182 is rotated about the pin 180 in the direction indicated by an arrow F in FIG. 17.

Accordingly, the suction cups 184 and 185 are adapted to be inclined as shown by imaginary lines in FIGS. 19 and 20. Thus, the leading end of the X-ray film held by the suction of the suction cups 184 can be peeled from a screen (not shown) or the like which has been stuck to the inner surface of the bottom of the cassette 10. In FIGS. 19 and 20, the illustration of the cassette 10 is omitted for the sake of simplicity.

It is preferable that, after the suction cups 184 and 185 have been inclined by the eccentric cam 202, judgement be made with respect to whether or not the X-ray film 15 is held by the suction of the suction cups 185. In consequence, even if the suction cup 185 is to attract by suction the X-ray film 15 with the suction cups 184 being positioned in an upright posture, it is possible to prevent the occurrence of any detection error due to the posture of the suction cup 185 when the X-ray film 15 tightly clings to the inner surface of the bottom of the X-ray film cassette 10. Another example of the film detecting mechanism for judging whether or not the X-ray film 15 is held by suction will be described later with reference to a second embodiment.

When the leading end portion of the X-ray film 15 is held by the suction of the suction cups 184 and 185, the shaft 166 is rotated by the drive force created by a drive source (not shown) to cause the suction cups 184 and 185 to rotate in the direction indicated by the arrow D in FIG. 17. Thus, the X-ray film 15 is took out of or unloaded from the cassette 10. The X-ray film thus unloaded is clamped at its intermediate portion between the rollers 192 and 200, and is then guided by a guide roller 208 toward a development device (not shown).

The following is a description of inserted-film positioning mechanisms 210 for positioning the X-ray film 15 after it has been inserted.

As shown in FIGS. 3 and 4, the inserted-film positioning mechanisms 210 are disposed in a pair at an inward position in the direction in which the film cassette 10 is inserted (at the top as viewed in FIG. 3). One of the pair of inserted-film positioning mechanisms 210 is disposed on the stationary base 33, and the other on the movable base 52.

First, the film positioning mechanism 210 disposed on the bottom surface of the stationary base 33 will be described below.

Figure 22:
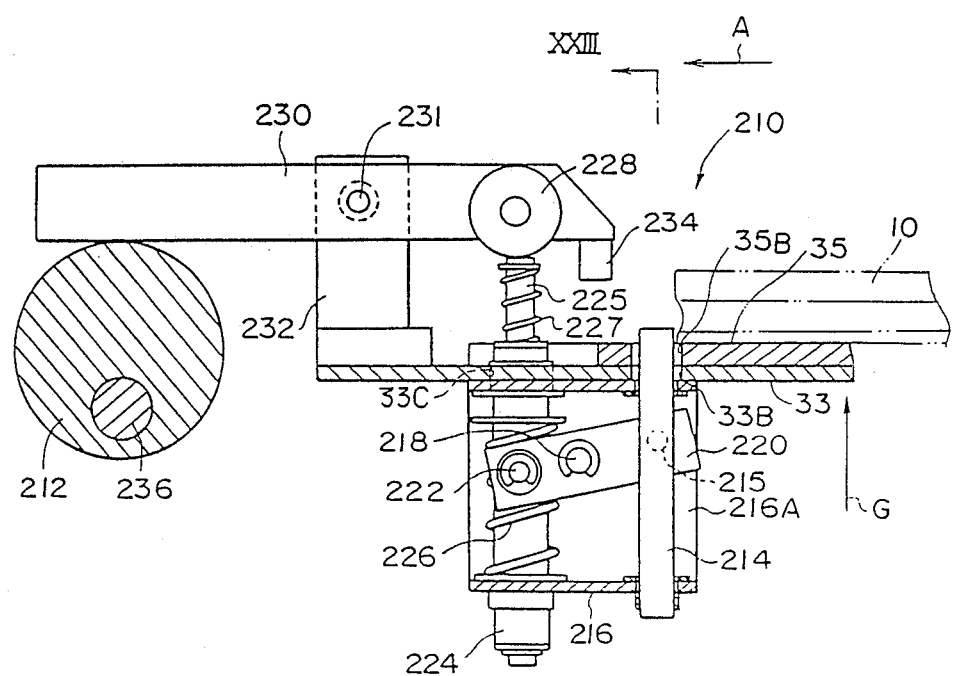
FIG. 22 is a section taken along the line XXII—XXII of FIG. 3 and illustrates a detail of an inserted-film positioning mechanism for positioning an X-ray film after it has been inserted.
Figure 23:
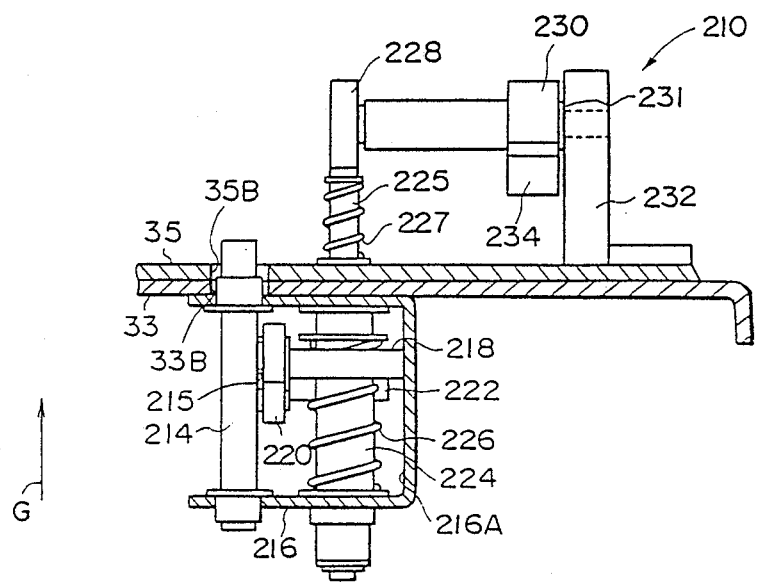
FIG. 23 is a section taken along the line XXIII—XXIII of FIG. 22.

As shown in FIGS. 22 and 23, a sub-bracket 216 having an angular C-like cross section is disposed on the bottom surface of the stationary base 33. The sub-bracket 216 is mounted through one of its laterally extending portions on the bottom surface of the stationary base 33. A stopper 214 is disposed in the sub-bracket 216. The opposite ends of the stopper 214 respectively extend through the two laterally extending portions of the bracket 216 so that the stopper 214 is capable of sliding along the length thereof. One of the opposite ends of the stopper 214 is capable of projecting upwardly through a through-hole 33b in the stationary base 33 and a through-hole 35b in the guide plate 35.

A block plate 220 is secured at one of its ends to an intermediate portion of the stopper 214 through a pin for pivotal movement with respect to the stopper 214. Further, the block plate 220 is supported pivotally at its intermediate portion on a bottom 216A of the sub-bracket 216 through a pin 218. Furthermore, the block plate 220 is supported pivotally at the other end thereof on a shaft 224 through a pin 222. The opposite ends of the shaft 224 extend through the two laterally extending portions of the sub-bracket 216. One of the opposite ends extends through a through-hole 33C in the stationary base 33 for movement in opposite directions, and thus this end of the shaft 224 is capable of projecting upwardly through the through-holes 33C. The shaft 224 is urged by the action of a compressive coiled spring 226 supported at its one end by the sub-bracket 216 in the direction indicated by an arrow G in FIG. 22, that is, in such a manner as to project upwardly from the stationary base 33.

The shaft 224 has a hollow body in which a shaft 225 is coaxially inserted. The shaft 225 is urged in the direction of the arrow G in FIG. 22 by a compressive coiled spring 227 supported at its one end by the top end of the shaft 224. Thus, the top end of the shaft 225 is pressed in contact with the periphery of a roller 228. The urging force of the compressive coiled spring 227 is set to be greater than that of the compressive coiled spring 226.

The roller 228 which abuts against the top end of the shaft 225 is rotatably supported at one end of a lock plate 230 which is located at an even more inward position in the direction in which the cassette 10 is inserted. The lock plate 238 is supported pivotally at its intermediate portion by a block 232 which is mounted on the stationary base 33 in an upright posture. The longitudinal axis of the lock plate 230 is disposed parallel to the direction in which the cassette 10 is inserted. A cushion 234 which is adapted to come into contact with the top surface of the lid 14 is attached to the bottom surface of the lock plate 230 at an inward position in the direction in which the cassette 10 is inserted. In a case where the lid 14 of the cassette 10 is to be closed, the lock plate 230 is rotated about the pin 231 in the clockwise direction in FIG. 22 by the motion of an eccentric roller 212 to press the cushion 234 against the top surface of the lid 14.

The eccentric roller 212 is fixed to the axially intermediate portion of a shaft 236 which is supported at its opposite ends by the pair of base frames 32. The axial length of the eccentric roller 212 is greater than the overall distance travelled by the movable base 52 in the direction indicated by the arrow B.

The inserted-film positioning mechanism 210 is disposed on the bottom surface of the movable base 52 in a similar manner to that in which it is secured on the bottom surface of the stationary base 33. The stopper 214 is capable of projecting upwardly through through-holes 52B and 53B (see FIG. 6). The lock plate 232 disposed on the movable base 52 is adapted to slide over the eccentric roller 212 along the length thereof concurrently with the movement of the movable base 52.

As shown in FIG. 3, the opposite ends of the shaft 236 provided with the eccentric roller 212 extend through the base frames 32, and a pulley 238 is secured to one of these opposite ends. A timing belt 240 is disposed between the pulley 238 and the drive shaft of a motor 242 to enable transmission of the drive force of the motor 242.

As shown in FIG. 22, when the lock plate 230 comes into contact with the portion of the periphery of the eccentric roller 212 at which the distance between the periphery and the center axis reaches a maximum, the top end of the stopper 214 passes through the through-hole 33B and projects upwardly through the through-hole 35B. When the leading end of the cassette 10 is inserted and brought into contact with the stopper 214, the X-ray film cassette 10 is positioned in its inserted state.

It is to be noted that, as shown in FIG. 17, a group of rollers 244 are disposed generally below the guide roller 208 so as to load a new X-ray film 15 into the X-ray film cassette 10 from which the old film 15 has been emptied.

The following is a description of the operation of the above-described embodiment.

The cassette in which the exposed X-ray film 15 is accommodated is inserted in the direction of the arrow A as shown in FIG. 3. The timing belt 70 is in advance spaced apart from the timing belt 40 by the maximum distance possible. An operator may insert the cassette 10 at a given position between the timing belts 70 and 40 which are spaced apart from each other by the maximum distance possible.

When the sensor 104 detects the fact that the cassette 10 has been inserted, the motor 74 is actuated to move the movable base 52 in the direction indicated by the arrow B. Thus, the timing belt 70 is brought into contact with a corresponding side of the cassette 10 to press the other side thereof into contact with the timing belt 40. If the operator inserts the cassette 10 slantwise with respect to the normal direction in which the cassette 10 should be inserted, the timing belt 70 presses the corresponding side of the cassette 10 toward the timing belt 40, thereby automatically correcting the orientation of the cassette 10 so that it may be kept parallel to the direction indicated by the arrow A. Therefore, the operator need not necessarily insert the X-ray film cassette 10 exactly parallel to the direction of the arrow A.

After the cassette 10 has been inserted between the timing belts 40 and 70, the motor 74 continues to drive the timing belt 70 to press the cassette 10 in contact with the timing belt 40 against the urging force of the compressive coiled spring 92 (FIG. 7). When the bracket 78 is moved by a predetermined distance, the position at which the bracket 78 should be stopped is detected by the limit switch 94, and the motion of the motor 74 is ceased. Therefore, since the cassette 10 is pressed by a constant pressure against the timing belt 40 by means of the timing belt 70, the cassette 10 is firmly held between the timing belts 40 and 70 by a constant strength of force so that the cassette 10 is positively transported in the direction of the arrow A by the timing belts 40 and 70.

The position of the movable base 52 in the direction of the arrow B is detected by the sensor 100 attached to the movable 52 (FIGS. 10 and 11). The width of the cassette 10 is detected through the detection of that position.

The cassette 10 which has been held between the timing belts 40 and 70 is guided further inwardly in the direction of the arrow A by the drive forces of the motors 44 and 62, and a leading edge 24 of the cassette 10 comes into contact with the sensors 106. At this moment, the latches 20 of the cassette 10 are disengaged from the inner step 16B by being pressed by the pins 128 disposed, respectively, on the bracket 34 and the movable base 52.

When the leading edge 24 of the cassette 10 comes into contact with the sensor 106, the position of the trailing edge of the cassette 10 is detected by the sensors 108. Thus, the length of the cassette 10 (in the direction of the arrow A) is detected, and the size of the cassette 10 is identified on the basis of that length and the width previously detected by the sensor 100.

After the latches 20 have been disengaged, the cassette 10 continues to held between the timing belts 40 and 70. In this state, the motors 46 and 62 are reversed to temporarily move the cassette 10 toward the cassette inserting inlet, and concurrently, the stopper mechanisms 110 operate to project the stopper plates 116 upwardly through the through-holes 35A and 53A. In this state, when the motors 44 and 62 are again driven in the forward direction, the -ray film cassette 10 is moved in the direction of the arrow A and its leading edge 24 comes into contact with the stopper portions 116A. Thus, the cassette 10 is located at the lid opening position which allows the lid 14 to be opened.

The swingable arms 130 of the lid opening mechanism 126 which has previously been located at an upward standby position are rotated counterclockwise in FIG. 14 toward the cassette 10 which has been held at the lid opening position, and thus the suction cups 146 are moved downwardly to hold the lid 14 by suction. Subsequently, when the swingable arms 130 are moved upwardly, the lid 14 is fully opened. In this state, the X-ray film unloading device 162 is actuated to move the suction cups 184 downwardly toward the corresponding end portion of the top surface of the X-ray film 15 accommodated in the cassette 10. The presence or absence of the X-ray film 15 is detected on the basis of whether or not the corresponding end portion of the X-ray film 15 is held by the suction of the inclined suction cup 185.

After the suction cups 184 have held that end portion of the X-ray film 15 by negative pressure, the motor 206 is actuated to rotate the eccentric cam 202 so that the suction cups 184 and 185 are inclined. Thus, the leading end portion of the X-ray film 15 is peeled from the screen (not shown) or the like which is stucked to the inner surface of the bottom of the cassette 10.

The suction cups 184 and 185 which have held by suction the leading end portion of the X-ray film 15 are moved upwardly by the rotation of the shaft 166 in the direction indicated by the arrow D in FIG. 17. Concurrently with this motion, the leading end of the X-ray film 15 is picked up in the cassette 10. When the suction cups 184 are moved to the position shown by the two-dot chain line in FIG. 17, the end portion 172A of the movable plate 172 is brought into contact pressure with the flat surface 198A, thereby causing the roller support plate 188 to rotate in the direction indicated by the arrow E in FIG. 17. When the roller support plate 188 is moved to the position shown by the two-dot chain lines in FIG. 17, the roller 192 is caused by the gravity of its own weight to drop into the cutouts 164A and thus the X-ray film 15 is clamped between the roller 193 and the roller 200. Subsequently, the suction of the suction cups 184 and 185 with respect to the X-ray film 15 is cancelled, and the film 15 is conveyed toward the development device (not shown) by the guide rollers 208.

The cassette 10 from which the X-ray film 15 has been emptied in the above-described manner is further moved in the direction of the arrow A with the lid 14 being fully opened. Thus, the empty cassette 10 is moved to an film inserting position at which a new X-ray film 15 should be inserted. While the cassette 10 is being moved, large variations in the angle of opening of the lid 14 is prevented by the rotation of each of the linkage arms 136 and the suction cups 146. At the film inserting position for the X-ray film 15, the cassette 10 is positioned by the inserted-film positioning mechanisms 210 each of which is so arranged that the stopper 214 operates in interlocking relationship with the lock plate 230. The stoppers 214 which is projected upwardly through the through-hole 35B and 53B come into contact with the leading edge 24 of the cassette 10.

A new one of the new X-ray film 15 which has been taken out of a film magazine (not shown) is guided by the guide rollers 244 and loaded into the cassette 10 which has thus been positioned at the film inserting position for the X-ray film 15. After loading, the cassette 10 is moved to the lid opening position which allows the lid 14 to be opened, and the suction of the suction cups 146 which are holding the lid 14 of the cassette 10 is cancelled. As a result, the lid 14 is caused by the gravity of its own weight to move downwardly so that it may be closed. However, the lid 14 stops its downward movement at a position at which it is opened by a slight amount, that is, in a state wherein the leading edge of the lid 14 is located immediately above the inner step 16B of the frame 16. In this state, the eccentric roller 212 is actuated by the drive force of the motor 242 to retract the stoppers 214 downwardly through the through-holes 35B and 53B, respectively.

The cassette 10 which has thus been partly opened is further moved in the direction of the arrow A until the leading end portion of the top surface of the lid 14 is located immediately below the cushion 234. When the leading end portion of the top surface of the lid 14 reaches the position immediately below the cushion 234, the eccentric roller 212 is again rotated by the drive force of the motor 242 to press the cushion 234 against the end portion of the top surface of the lid 14. Thus, the latches 20 are brought into engagement with the inner step 16B of the cassette 10. In this case, even if the shaft 225 is pressed downwardly by the roller 228, the stopper 214 is not projected upwardly from the guide plate 35, since the shaft 225 and the shaft 224 are movable with respect to each other along their respective axes. After the lid 14 has been closed, the motors 44 and 62 are reversed and the cassette 10 is moved to the cassette inserting inlet while being guided by the timing belts 40 and 70. The cassette 10 is stopped with its trailing end portion projecting through the cassette inserting inlet by a slight amount. When the timing belt 70 is moved in the direction away from the timing belt 40 by the reverse motion of the motor 74, the X-ray film cassette 10 is released from its firmly held state, so that it can be taken out of the film cassette opener.

The following is a description of the second embodiment of the present invention.

Figure 24:
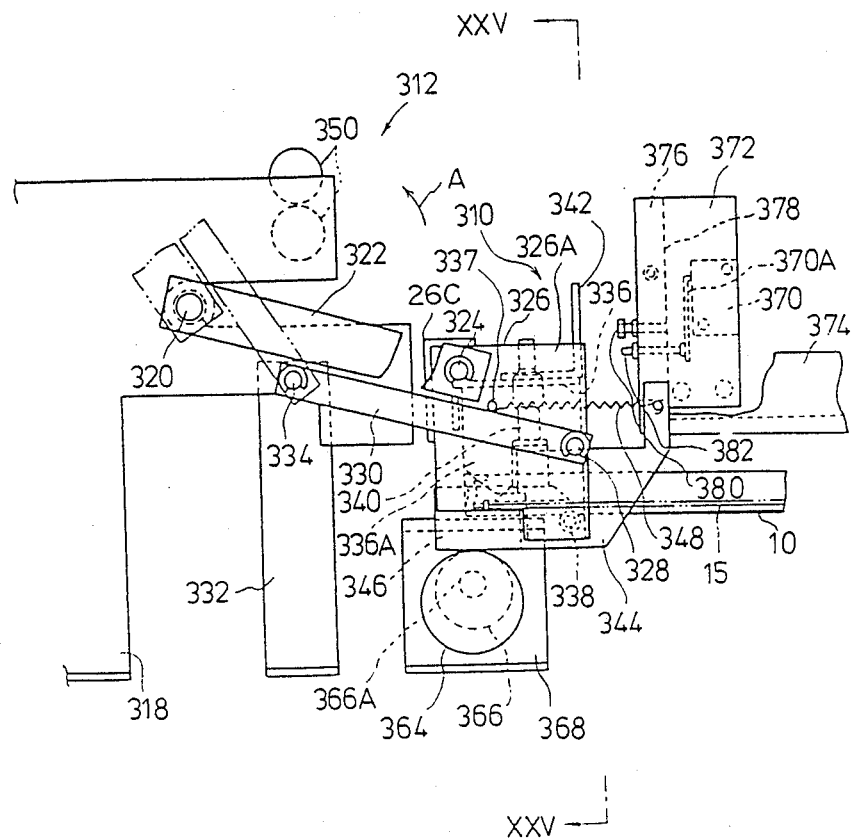
FIG. 24 is a side elevation illustrating a second embodiment, with portions omitted and broken away for the sake of clarity, another form of film detecting mechanism being incorporated in the film cassette opener according to the present invention.
Figure 25:
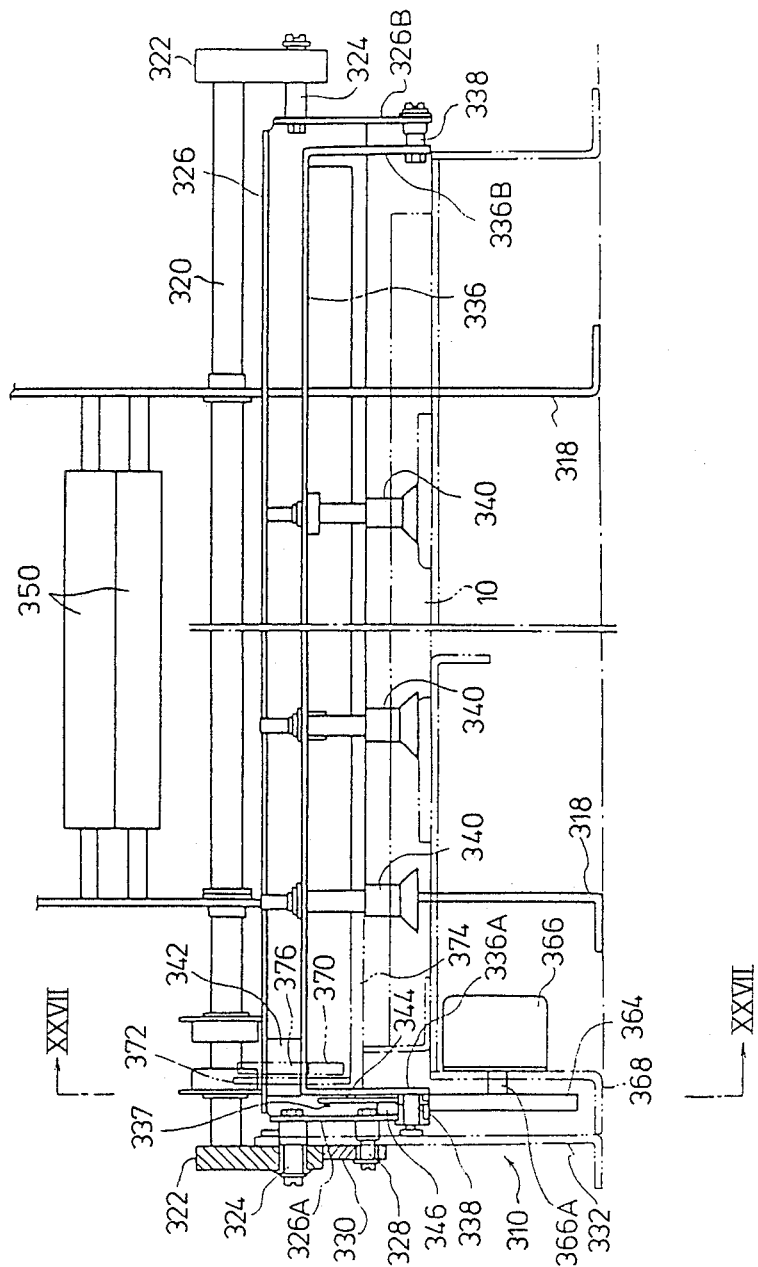
FIG. 25 is a section taken along the line XXV—XXV of FIG. 24.

FIGS. 24 and 25 illustrate an X-ray film unloading device 312 which is applicable to the film cassette opener in accordance with the present invention. The X-ray film unloading device 312 employs a film detecting mechanism 310 for detecting the presence of a film within a film cassette which mechanism differs in construction and arrangement from the first embodiment. FIG. 24 is a diagrammatic side elevation of the X-ray film unloading device 312 and FIG. 25 is a cross section taken along the line XXV—XXV of FIG. 24.

As shown in FIGS. 24 and 25, the X-ray film unloading device 312 is provided with a pair of side plates 318 which are mounted on a base (not shown) in an upright manner. The shaft 320 is located at a position which corresponds to an intermediate portion of each of the side plates 318 in the direction of the height thereof, and is supported at its intermediate portion by the side plates 318 for rotation about its axis. The opposite ends of the shaft 320 are extended in opposite directions through the side plates 318.

One end of each arm 322 is fixed to each of the opposite ends of the shaft 320 which are extended outwardly from the pair of side plates 318. A movable plate 326 has opposite end portions 326A and 326B which are bent downwardly as viewed in FIG. 25, and the other ends of the respective arms 322 pivotally support the opposite end portions 326A and 326B through corresponding pins 324. The movable plate 326 is disposed such that its longitudinal axis is parallel to the longitudinal axis o the shaft 320.

One end of a support arm 330 is pivotally supported by the end portion 326A of the movable plate 326 through the corresponding pin 328. The other end of the support plate 330 is pivotally supported through a pin 334 by a frame 332 which is mounted on a base (not shown) in an upright manner. The axis-to-axis distance between the shaft 320 and the pin 324 is equal to that between the pin 328 and the pin 334, and the axis-to-axis distance between the shaft 320 and the pin 334 is equal to that between the pin 324 and the pin 328. Therefore, the support arm 330, the corresponding one of the arms 322, and the end portions 326A constitute in combination a parallel link mechanism.

A suction-cup mounting plate 336 is disposed at a position below the movable plate 326 and defined between the end portions 326A and 326B. The suction-cup mounting plate 336 is disposed such that its longitudinal axis is parallel to the longitudinal axis of the shaft 320, and has opposite end portions 336A and 336B which are bent downwardly as viewed in FIG. 25. The end portions 336A and 336B are pivotally supported through corresponding pins 338 by the end portions 326A and 326B of the movable plate 326, respectively.

A plurality of suction cups 340 are fixed to the suction-cup mounting plate 336 in such a manner that their suction surfaces face down.

The suction cups 340 are adapted to be inserted into the interior of the cassette 10 with its lid (not shown) being opened. The X-ray film 15 is accommodated in the cassette 10. After the suction cups 340 have held the X-ray film 15 by suction, they are rotated in the direction indicated by the arrow A in FIG. 24 by the operation of the parallel link mechanism to thereby draw the X-ray film 15 out of the cassette 10. The X-ray film 15 which is taken out is clamped between a pair of rollers 350 which are rotatably supported between the side plates 318. In this manner, the X-ray film 15 is conveyed to a development device (not shown).

Figure 26:
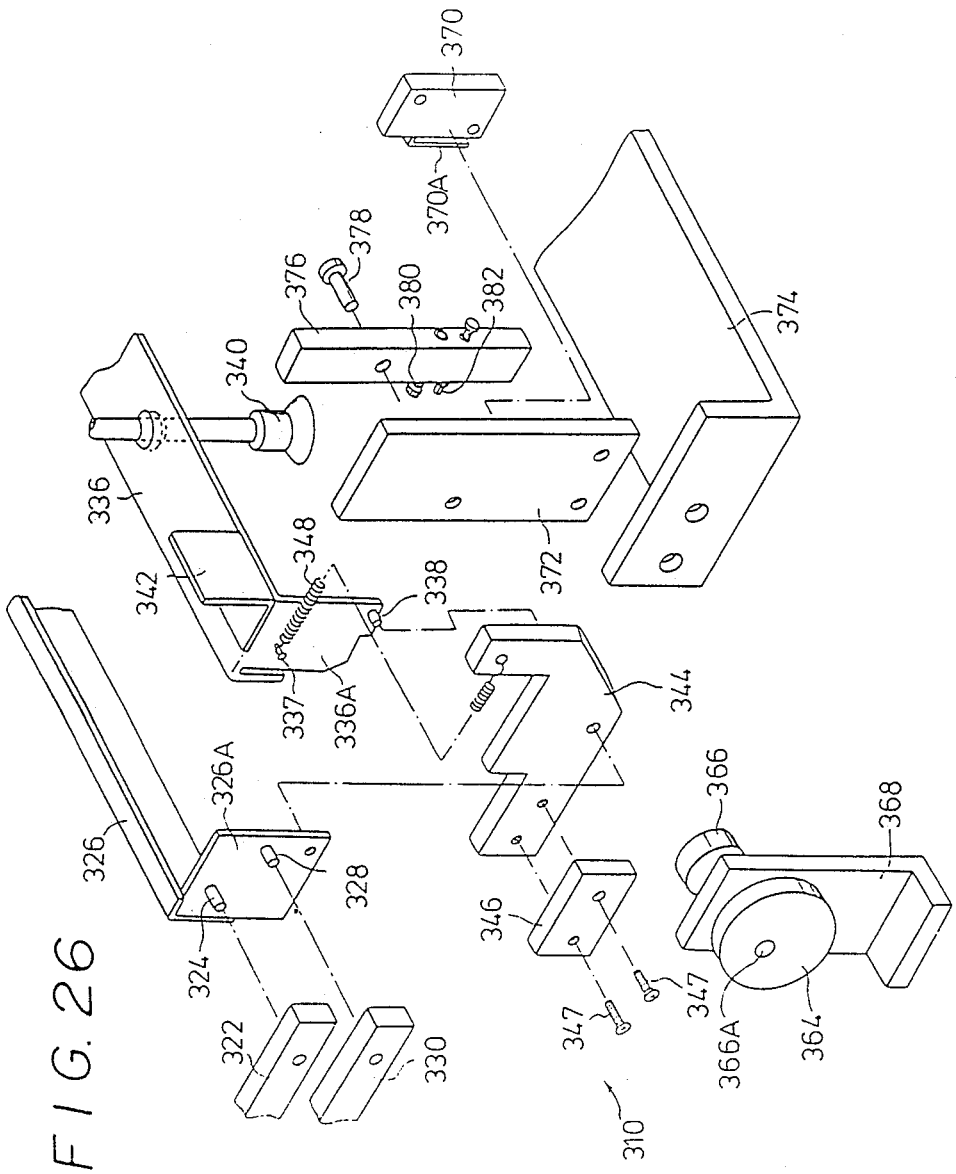
FIG. 26 is an exploded perspective view of a film detecting mechanism for detecting the presence or absence of an X-ray film within an X-ray film cassette.

FIG. 26 illustrates in perspective exploded view the film detecting mechanism 311 for detecting the presence of the film 15 within the film cassette 10 which is used with the X-ray film unloading device.

As shown in FIG. 26, a plate 342 having an L-like cross section is fixed to the top surface of the suction-cup mounting plate 336 in the vicinity of the end portion 336A. One flat portion of the L-shaped plate 342 extends upright from the top surface of the suction-cup mounting plate 336.

A rotatable lever 344 which is supported at its intermediate portion for pivotal movement about a pin 338 is disposed between the end portions 336A of the suction-cup mounting plate 336 and the end portion 326A of the movable plate 326.

A tension coiled spring 348 is engaged at its one end with the rotatable lever 344 and at the other with a pin 337 projecting horizontally from the end portion 336A. The tension coiled spring 348 is located parallel to the surface of the end portion 336A.

An abutment block 346 is attached by bolts 347 to the rotatable lever 344. The abutment block 346 is formed of a synthetic resin (for example, a polyacetal resin).

At the same time that the suction cups 340 are moved in the direction of the arrow A in FIG. 24 by the parallel link mechanism, the L-shaped plate 342, the rotatable lever 344, the abutment block 346, and the tension coiled spring 348 are adapted to be moved. In this case, since the counterclockwise rotation of the rotatable lever 344 about the pin 338 is inhibited by a stopper (not shown), the rotatable lever 344 is allowed to be rotated in the direction of the arrow A while the posture shown in FIG. 24 is being maintained. The suction-cup mounting plate 336 is forced by the gravity of its own weight to rotate counterclockwise about the pin 338. However, since the plate 336 is linked with the rotatable lever 344 through the tension coiled spring 348, that rotation is inhibited. Therefore, the suction-cup mounting plate 336 is also allowed to rotate in the direction of the arrow A while the posture shown in FIG. 24 is being maintained.

An eccentric cam 364 is located below the abutment block 346. The eccentric cam 364 is disposed so that its periphery abuts against the abutment block 346 attached to the rotatable lever 344 in the state shown in FIG. 24. The eccentric cam 364 is secured to a drive shaft 366A of a motor 366 which is fixed to a bracket 368 mounted in an upright posture on a base (not shown).

Figure 29:
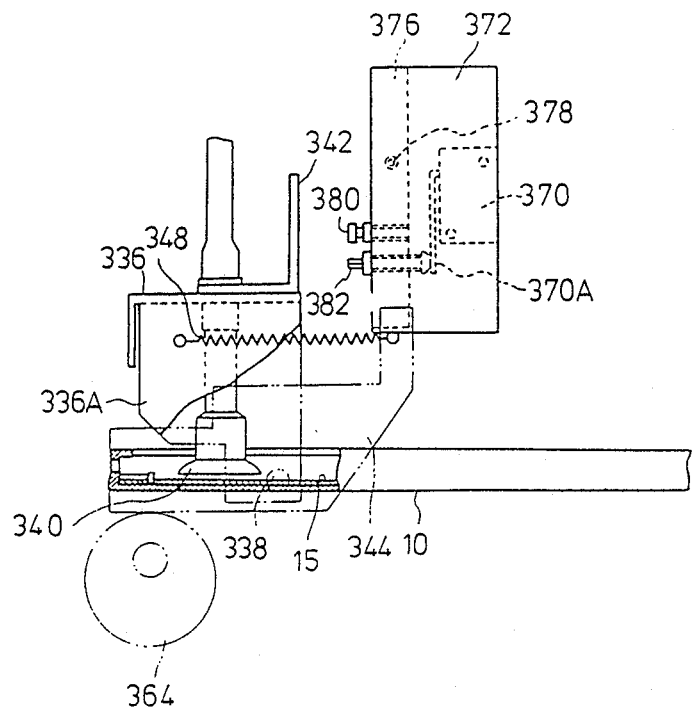

When the eccentric cam 364 is rotated by the drive force of the motor 366, the abutment block 346 is moved in sliding contact with the outer periphery of the eccentric cam 364 to cause the rotatable lever 344 to rotate about the pin 338 in the clockwise direction as viewed in FIG. 24. In a state wherein the abutment block 346 abuts against the portion of the periphery of the eccentric cam 362 at which the distance between its center axis to the periphery reaches a minimum, the rotatable lever 344 assumes the state shown in FIG. 24. In this state, as shown in FIG. 29, the suction surfaces of the suction cups 340 are disposed parallel to the surface of the X-ray film 15.

Also, when the eccentric cam 364, in that state, is rotated by the drive force of the motor 366, the abutment block 346 is moved in sliding contact with the periphery of the eccentric cam 364 to cause the rotatable lever 344 to rotate about the pin 388 in the clockwise direction in FIG. 24.

A limit switch 370 is disposed ahead of the suction-cup mounting plate 336, that is, on the side of the plate 336 nearer to the cassette inserting inlet. The limit switch 370 is fixed to a mounting bracket 372. The mounting bracket 372 is fixed to a frame 374 which in turn is fixed to a base (not shown) through a frame (not shown).

A lever 376 is attached to the mounting bracket 372 at a position which corresponds to a contact member 370A of the limit switch 370. The lever 376 is supported at its axially intermediate portion through a pin 378 by the mounting bracket 372 for pivotal movement about the axis of the pin 378. The lever 376 is provided with a bolt 380 whose head projects toward the plate 342 attached to the top surface of the suction-cup mounting plate 336. The bolt 380 is screwed into a tapped hole which is formed in the lever 376, and the position of the head of the bolt 380 which is projected from the lever 376 can be adjusted.

Another bolt 382 is provided below the bolt 380. The head of the bolt 382 is projected toward the limit switch 370. The tail end of the bolt 382 opposite to the head extends through the lever 376 toward the plate 342. Similarly to the bolt 380, the bolt 382 is screwed into another tapped hole which is formed in the lever 376, and the position of the head of the bolt 382 which is projected from the lever 376 can be adjusted.

Figure 27:
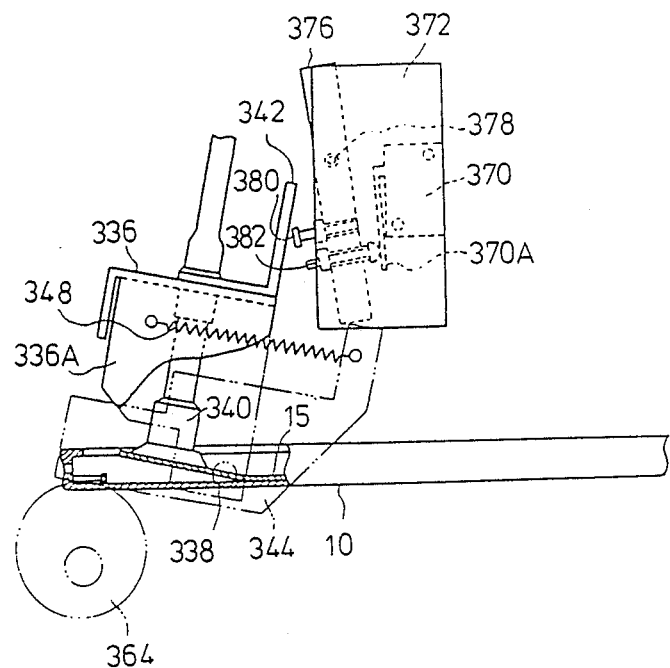
FIGS. 27, 28 and 29 are fragmentary sections taken along the line XXVII—XXVII of FIG. 25 and illustrate the operation of the film detecting mechanism for the X-ray film cassette.

Accordingly, when the suction-cup mounting plate 336 is rotated about the pin 338 in the clockwise direction in FIG. 24, the plate 342 is brought into contact with the head of the bolt 380 to cause the lever 376 to rotate about the pin 378 in the counterclockwise direction in FIG. 24, and thus the state of the mechanism proceeds from that shown in FIG. 24 to that shown in FIG. 27. In consequence, the tail end of the bolt 382 presses the contact member 370A of the limit switch 370.

The operation of the second embodiment will be described below.

Figure 28:
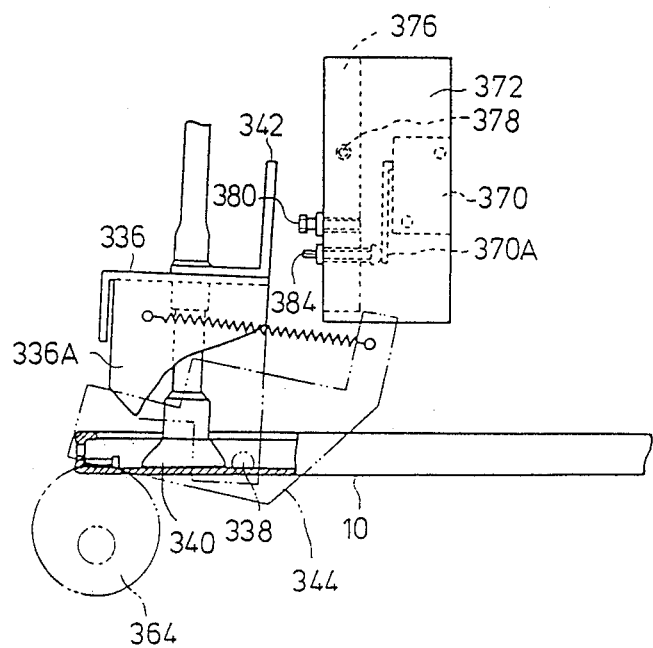

If no X-ray film 15 is accommodated in the cassette 10, the suction cups 340 attracts by suction the inner surface of the bottom of the cassette 10. In this state, the eccentric cam 364 is rotated by the drive force of the motor 366. This rotation causes the rotatable lever 344 to rotate about the pin 388 in the clockwise direction in FIG. 24. During this time, although the tension coiled spring 348 urges the suction-cup mounting plate 336 to rotate in the same direction, the suction-cup mounting plate 338 does not rotate about the pin 338 since the suction cups 340, as shown in FIG. 28, hold by suction the inner surface of the bottom of the cassette 10. Therefore, since the plate 342 does not come into contact with the head of the bolt 380, the limit switch 370 is not actuated. In this manner, the fact that no X-ray film 15 is accommodated in the cassette 10 is detected.

If the X-ray film 15 is accommodated in the cassette 10, the suction cups 340 attract by suction the X-ray film 15 within the same. Then, the eccentric cam 346 is rotated by the drive force of the motor 366. This rotation causes the rotatable lever 344 to rotate about the pin 338 in the clockwise direction in FIG. 24. As the rotatable lever 344 is rotated, the suction-cup mounting plate 336 is rotated about the pin 338 in the clockwise direction in FIG. 4 by the urging force of the tension coiled spring 348. At this time, the suction cups 340 peel the leading end portion of the X-ray film 15 from the inner surface of the bottom of the cassette 10, and the suction surfaces of the suction cups 340 are inclined with respect to the inner surface of the bottom of the cassette 10. The suction-cup mounting plate 336 is further rotated in the same direction by the urging force of the tension coiled spring 348. Thus, the plate 342 attached to the top of the suction-cup mounting plate 336 is brought into contact with the head of the bolt 380 to cause the lever 376 to rotate about the pin 378 as shown in FIG. 27. When the lever 376 is rotated about the pin 378, the tail end of the bolt 382 presses the contact member 370A of the limit switch 370, thereby actuating the limit switch 370. In this manner, the fact that the X-ray film is accommodated in the cassette 10 is detected. As will be appreciated from the foregoing, in accordance with the present invention, the opposite sides of the film cassette are held by the first elongated member and the second elongated member. In such a state, at least one of the side brought into contact with the first elongated member and the side brought into contact with the second elongated member is pressed by a predetermined force applied by the pressing means in the direction in which the film cassette is held further tightly between the first and second elongated members. Accordingly, the opposite sides of the film cassette are positively held between them, and are transported forwardly and backwardly.

What is claimed is:

1. A film cassette opener for opening a film cassette for accommodation of a film, to unload said film from said film cassette and/or to load said film in said film cassette, comprising:
   a first elongated member disposed parallel to a path along which said film cassette is allowed to move within said film cassette opener, said first elongated member being brought into contact with one side of said film cassette when said film cassette is placed on said path;

a second elongated member disposed parallel to said path and spaced from said first elongated member in parallel with each other, said second elongated member being brought into contact with the other side of said film cassette opposite to said one side;

holding means for causing at least one of said first elongated member and said second elongated member to move toward and away from the other of the same, thereby causing said first elongated member and said second elongated member to hold said film cassette therebetween;

pressing means for pressing at least one of said first elongated member and said second elongated member which hold said film cassette therebetween in the direction in which said one is made to approach the other of said first and second elongated members; and first driving means for causing movement of said first elongated member and said second elongated member which hold said film cassette therebetween so as to cause said film cassette to move along said path.

2. A film cassette opener according to claim 1, wherein each of said first elongated member and said second elongated member includes a pair of pulleys and an endless belt looped between said pair of pulleys, a straight portion of said endless belt looped between said pulleys being brought into contact with said sides of said film cassette.

3. A film cassette opener according to claim 1, wherein said holding means includes one of base members each providing support for said first elongated member and said second elongated member; and second driving means for causing one of said base members to move toward and away from the other of the same.

4. A film cassette opener according to claim 3, wherein said pressing means includes a member which is supported by said base member for movement with respect to said base member, said member being arranged to receive a drive force from said second driving means and transmit said drive force through a resilient member to said base member.

5. A film cassette opener according to claim 4, wherein said first driving means includes a motor supported by each of said base members for causing rotation of one pulley in each of said pulley pairs.

6. A film cassette opener according to claim 2 further comprising limiting means for limiting the displacements of the portions of said respective first and second elongated members, which are brought into contact with said sides of said film cassette, so that said displacements of said portions in the direction in which said film cassette is released is restricted to less than a predetermined amount.

7. A film cassette opener according to claim 1 further comprising a film detecting mechanism for detecting the presence or absence of said film within said film cassette.

8. A film cassette opener according to claim 7, wherein said film cassette has a planar portion which carries said film and wherein said film detecting mechanism includes suction means capable of attracting by suction said film carried on said planar portion of said film cassette; inclination means for causing the suction surface of said suction means to incline with respect to said planar portion of said film cassette; and detecting means for detecting the presence or absence of said film by sensing the fact that said suction surface is inclined with respect to said planar portion of said film cassette.

9. A film cassette opener according to claim 8, wherein said inclination means includes a pivot axis which supports said suction means for pivotal movement about said pivot axis; and cam means for causing said suction means to pivot about said pivot axis.

10. A film cassette opener according to claim 9, wherein said film detecting mechanism further includes anti-inclination means for preventing the inclination of said suction means if no film is carried on said planar portion of said film cassette.

11. A film cassette opener according to claim 10, wherein said anti-inclination means includes a lever interposed between said suction means and said cam means and capable of rotating together with said suction means, said lever being capable of rotating with respect to said suction means if a force acting to move said suction means and said lever in the directions away from each other reaches a predetermined level.

12. A film cassette opener according to claim 1 further comprising a film unloading mechanism for unloading said film from said film cassette.

13. A film cassette opener according to claim 12, wherein said film unloading mechanism includes holding means for holding a leading end portion of said film carried on the inner surface of the bottom of said film cassette; rotating means for causing said holding means which holds said film to rotate in the direction in which said film is unloaded to thereby separate said leading end of said film from said inner surface of said bottom of said film cassette; and moving means for moving said holding means between a position (a first position) at which said film is held and a position (a second position) at which said film is released.

14. A film cassette opener according to claim 13, wherein said film unloading mechanism includes a pair of conveyance rollers for holding and conveying said film placed at said second position; and displacement means for moving said pair of conveyance rollers away from each other when said holding means is located at said first position and for causing said pair of conveyance rollers to clamp said film when said holding means is moved to said second position by said moving means.

15. A film cassette opener according to claim 14, wherein said moving means includes a parallel link mechanism.

16. An X-ray film cassette opener for effecting loading and/or unloading of an X-ray film by receiving an X-ray film cassette, causing said cassette to move along a path of travel, and opening a lid of said cassette, comprising:

first guide means including a first endless belt looped between a first pair of pulleys for guiding said cassette along said path of travel by bringing a straight portion of said first endless belt defined between said first pair of pulleys into contact with one side of said X-ray film cassette;

second guide means including a second endless belt looped between a second pair of pulleys for guiding said cassette along said path of travel by bridging a straight portion of said second endless belt defined between said second pair of pulleys into contact with the other side of said X-ray film cassette opposite to said one side;

holding means for causing said first and second endless belts to hold said X-ray film cassette therebetween by moving at least one of said first and second guide means in the direction in which said first and second end belts approach each other;

pressing means for pressing at least one of said first and second endless belts between which said X-ray film cassette is held toward the other of the same; and first drive means for driving said first and second endless belts which hold said X-ray film cassette therebetween so that said X-ray film cassette may be moved along said path of travel.

17. A film cassette opener according to claim 16, wherein said first guide means and said second guide means respectively include base members for providing support for said first pair of pulleys and said second pair of pulleys, said holding means including second drive means for causing one of said base members to move toward and away from the other, and said pressing means including a member which is supported by one of said base members for movement with respect thereto, said member arranged to receive a drive force from said second driving means and transmit said drive force through a resilient member to said one of said base members.

18. A film detecting mechanism according to claim 16, wherein said film cassette opener further includes a film detecting mechanism for detecting the presence or absence of said film within said X-ray film cassette.

19. A film cassette opener according to claim 18, wherein said film cassette has a planar portion which carries said film and wherein said film detecting mechanism includes suction means capable of attracting by suction said film carried on said planar portion of said film cassette; inclination means for causing the suction surface of said suction means to incline with respect to said planar portion of said film cassette; and detecting means for detecting the presence or absence of said film by sensing the fact that said suction surface is inclined with respect to said planar portion of said film cassette.

20. A film cassette opener according to claim 19, wherein said film detecting mechanism further includes anti-inclination means for preventing the inclination of said suction means if no film is carried on said planar portion of said film cassette.

21. A film cassette opener according to claim 16 further comprising a film unloading mechanism for unloading said film from said film cassette.

* * * * *